United States Patent
Thompson

(10) Patent No.: US 6,554,175 B1
(45) Date of Patent: Apr. 29, 2003

(54) FRICTION STIR WELDING MACHINE AND METHOD

(75) Inventor: Jack Mansfield Thompson, Mason, OH (US)

(73) Assignee: General Tool Company, Cincinnati, OH (US)

( * ) Notice: Subject to any disclaimer, the term of this patent is extended or adjusted under 35 U.S.C. 154(b) by 0 days.

(21) Appl. No.: 09/697,202

(22) Filed: Oct. 26, 2000

Related U.S. Application Data

(63) Continuation-in-part of application No. 09/562,732, filed on May 1, 2000, now Pat. No. 6,302,315.

(51) Int. Cl.$^7$ ................................................ B23K 20/12
(52) U.S. Cl. ..................................... 228/112.1; 228/2.3
(58) Field of Search ........................ 228/112.1, 114.5, 228/2.1, 2.3, 25, 45, 119

(56) References Cited

U.S. PATENT DOCUMENTS

| | | |
|---|---|---|
| 2,148,704 A | 2/1939 | Merritt |
| 2,759,378 A | 8/1956 | Youssoufian et al. |
| 3,507,143 A | 4/1970 | Georg |
| 3,512,476 A | 5/1970 | Georg |
| 3,523,485 A | 8/1970 | Klein |
| 3,559,530 A | 2/1971 | Wagner |
| 3,730,051 A | 5/1973 | Hatzig |
| 3,831,262 A | 8/1974 | Luc |
| 3,935,420 A | 1/1976 | Sandstrom |
| 4,122,990 A | 10/1978 | Tasaki et al. |
| 4,144,110 A | 3/1979 | Lue |
| 4,155,300 A | 5/1979 | Baltschun |
| 4,470,868 A | 9/1984 | MacLaughlin et al. |
| 4,920,783 A | 5/1990 | Greaves et al. |
| 5,056,971 A | 10/1991 | Sartori |

(List continued on next page.)

FOREIGN PATENT DOCUMENTS

| | | |
|---|---|---|
| GB | 9405491.3 | 3/1994 |
| RU | SU 1393567 A1 | 5/1988 |
| RU | SU 1712107 A1 | 2/1992 |

OTHER PUBLICATIONS

Dr.–Ing. P. Drews and Dipl.–Ing. G. Wichelhaus, *The Connecting of CrNi–steel to Aluminum and AL Alloys by the Friction Welding Process*, Article and Translation of Article from Industrie–Anzeiger Schweiss–und Schneidtechnik, May 26, 1970.

S. Elliott and E.R. Wallach, *Joining Aluminium to Steel—A Review of Mechanisms and Techniques in Friction Welding and Diffusion Bonding*, Research Report, Jun. 1979.

Primary Examiner—Tom Dunn
Assistant Examiner—Jonathan Johnson
(74) Attorney, Agent, or Firm—Wood, Herron & Evans, L.L.P.

(57) ABSTRACT

A friction stir welding machine includes a table for supporting parts to be welded and a frame extending over the table. A first drive is supported by a first element of the frame and is operatively connected to a spindle having a tool. The first drive moves the tool in a first direction, and the first drive disengages from the spindle after the tool contacts the material. A second drive is supported by a second element of the frame and is operatively connected to the spindle for moving the tool into the parts at a joint, thereby initiating friction stir welding process. The friction stir welding machine has a pair of rollers mounted in a roller support with an axis of rotation substantially perpendicular to an axis of rotation of the tool. The rollers contact a surface of the material in response to the tool penetrating the material to a desired depth. The roller support is pivotally mounted to the spindle and has a pivot axis substantially perpendicular to both an axis of rotation of the rollers and the axis of rotation of the tool. The work supporting table of the friction stir welding machine has a vacuum hold down system for securing the parts to the table.

20 Claims, 17 Drawing Sheets

U.S. PATENT DOCUMENTS

| | | |
|---|---|---|
| 5,156,316 A | 10/1992 | Nied et al. |
| 5,425,607 A | 6/1995 | Hardesty |
| 5,460,317 A | 10/1995 | Thomas et al. |
| 5,611,479 A | 3/1997 | Rosen |
| 5,697,511 A | 12/1997 | Bampton |
| 5,697,544 A | 12/1997 | Wykes |
| 5,713,507 A | 2/1998 | Holt et al. |
| 5,718,366 A | 2/1998 | Colligan |
| 5,758,999 A | 6/1998 | Giese |
| 5,769,306 A | 6/1998 | Colligan |
| 5,794,835 A | 8/1998 | Colligan et al. |
| 5,813,592 A | 9/1998 | Midling et al. |
| 5,829,664 A | 11/1998 | Spinella et al. |
| 5,862,975 A | 1/1999 | Childress |
| 5,893,507 A | 4/1999 | Ding et al. |
| 5,921,461 A | 7/1999 | Kennedy et al. |
| 5,971,247 A | 10/1999 | Gentry |
| 5,971,252 A | 10/1999 | Rosen et al. |
| 5,972,524 A | 10/1999 | Childress |
| 5,975,406 A | 11/1999 | Mahoney et al. |
| 6,050,475 A | 4/2000 | Kinton et al. |
| 6,070,784 A | 6/2000 | Holt et al. |
| 6,138,895 A | 10/2000 | Oelgoetz et al. |

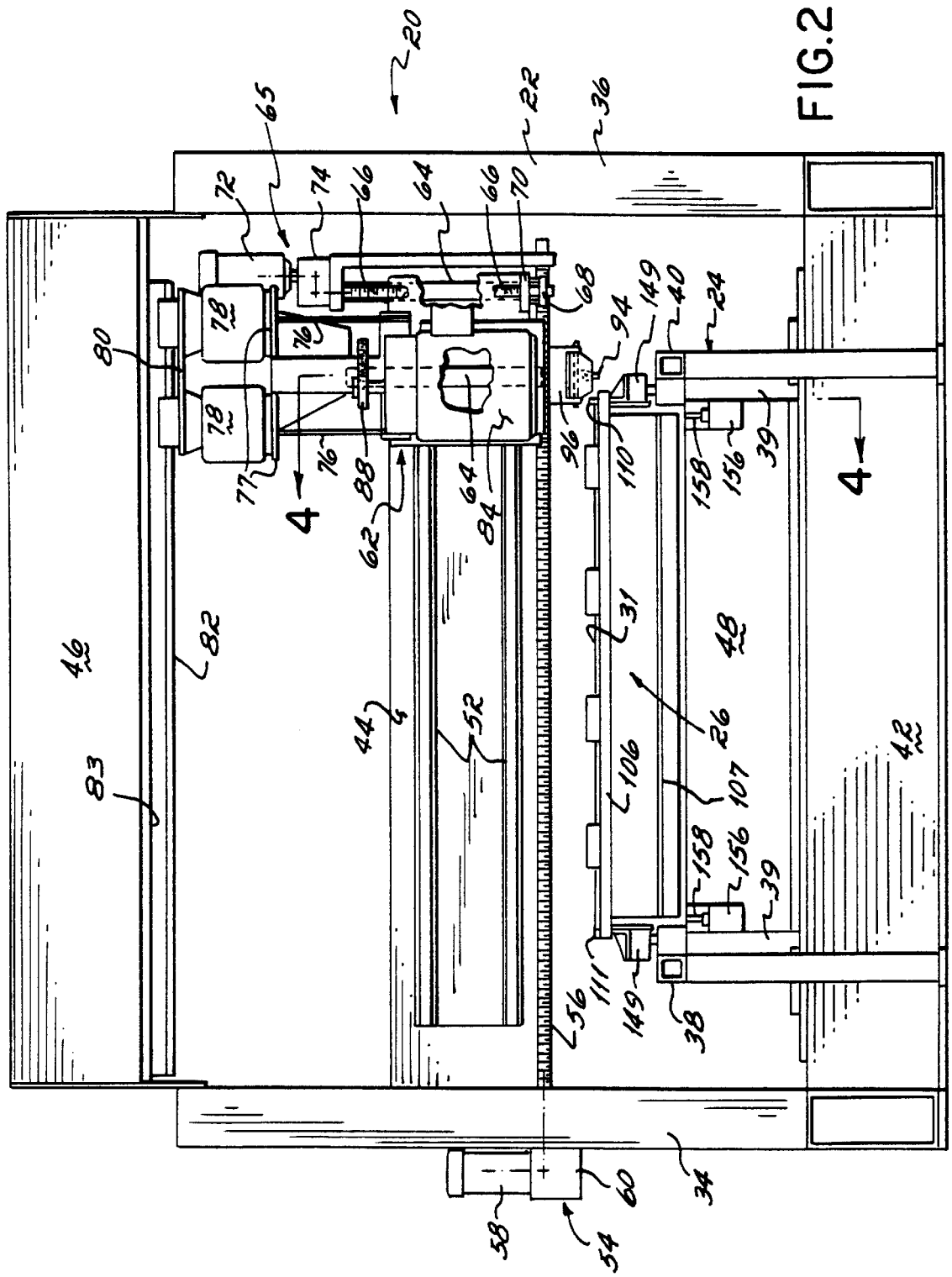

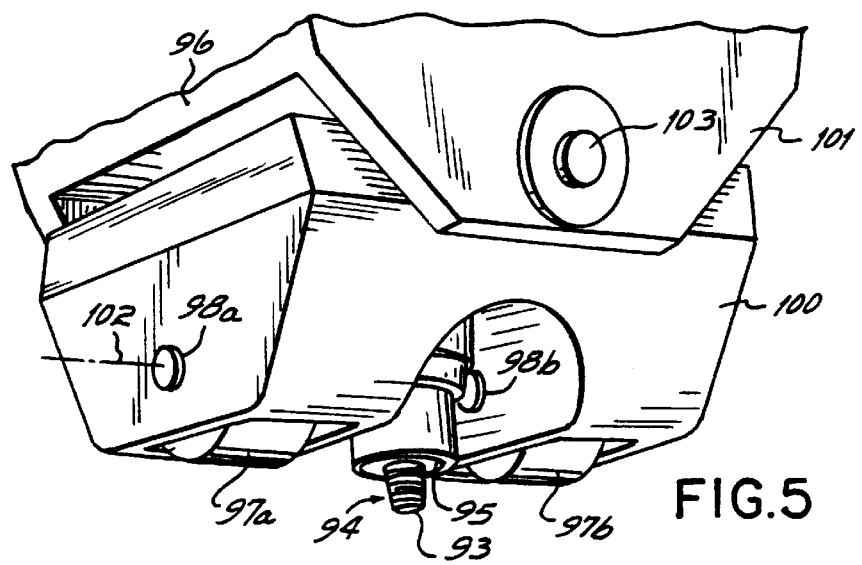
FIG.5
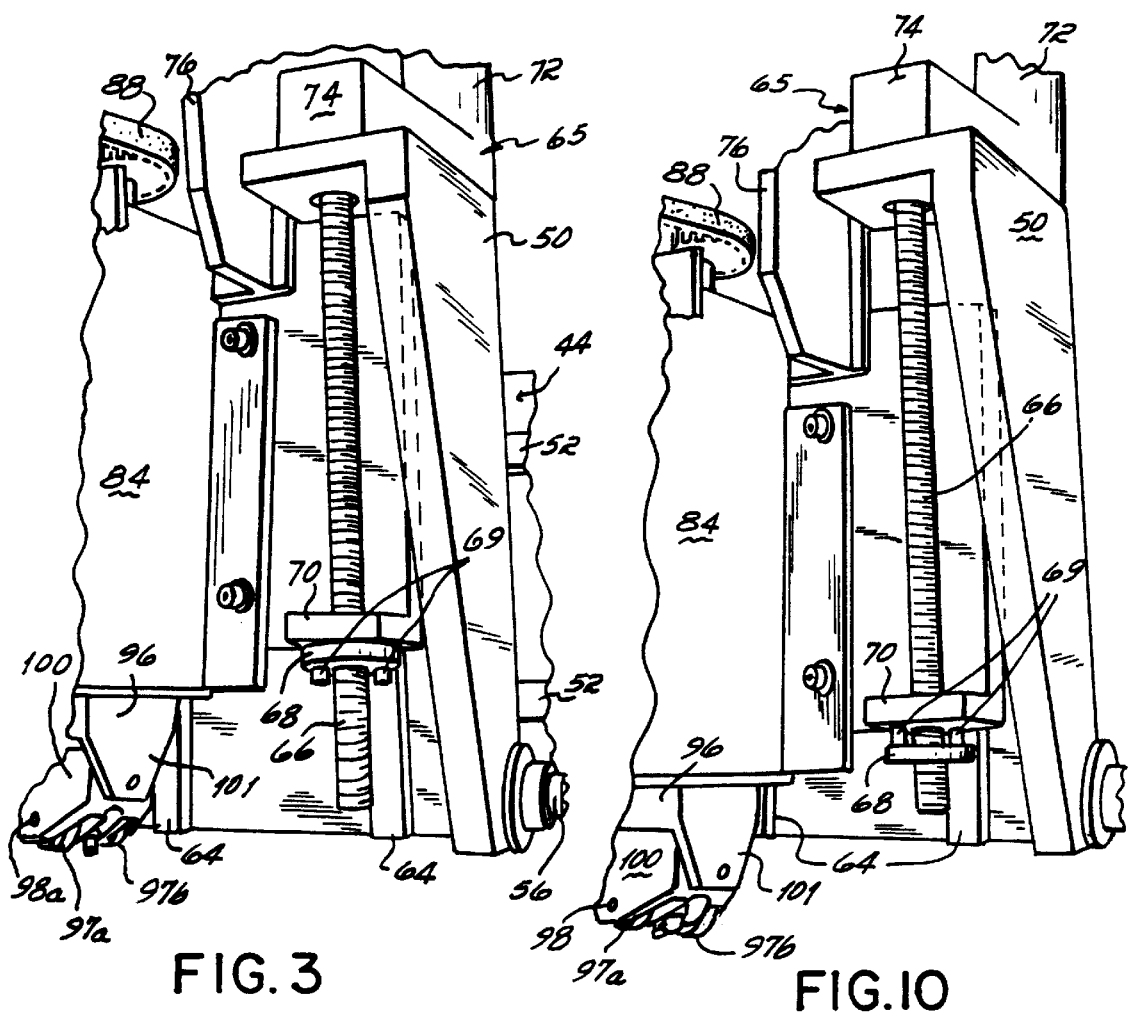
FIG.3
FIG.10

THERMAL GROWTH CALCULATIONS SPREADSHEET

|  |  |  |  |  | Tool | | All Fused Quartz | |
|---|---|---|---|---|---|---|---|---|
| station | ambient | Temp F | Delta F | Alpha in/in/deg F | String Expansion | Alpha in/in/deg F | Expansion |
| 0 | 75 | 900 | 825 | 8.40E-06 | | | |
| 9.75 | 75 | 800 | 725 | 5.20E-06 | 0.0635 | 3.00E-07 | 0.0023 |
| 14 | 75 | 100 | 25 | 8.40E-06 | 0.0083 | 3.00E-07 | 0.0005 |
| 41 | 75 | 75 | 0 | | 0.0028 | 3.00E-07 | 0.0001 |
|  |  |  |  | Total= | 0.0746 | | 0.0028 |

FRICTION STIR WELDING MACHINE AND METHOD

This application is a CIP of Ser. No. 09/562,732, filed May 1, 2000, now U.S. Pat. No. 6,302,315.

FIELD OF THE INVENTION

The present invention generally relates to welding machines and more particularly, to a friction stir welding machine.

BACKGROUND OF THE INVENTION

The process of friction stir welding is well known and is especially useful for welding a butt joint formed between adjacent metal pieces, for example, aluminum alloys, copper alloys, etc. The process uses a nonconsumable rotating tool comprised of a pin, often threaded, extending from a shoulder. To effect a weld, the rotating pin is forced into the joint and the adjacent metal pieces until a surface of the shoulder contacts the upper surfaces of the workpieces. The friction of the rotating shoulder on the metal pieces plasticizes an annular region of the metal around the pin. The rotating tool is then moved along the joint; and as the pin is moved along the joint, the pressure provided by the leading face of the pin forces hot, plasticized metal to the back of the pin where it fills the void left by the moving pin. After cooling and hardening, the weld left is a fine grained, hot worked joint that is very strong and resistant to breaking.

The friction stir welding process presents several challenges to a machine structure. For example, in moving the rotating tool toward and away from the weld joint and along the weld joint, known drive mechanisms, for example, a screw drive, may be utilized. However, the process of sinking the nonconsumable rotating pin into the solid metal of the weld joint requires a very large force that must be maintained while the pin is traversed along the joint between the metal pieces. A screw drive as well as most other types of drives often found on a machine are normally used to control position and velocity of the member being moved. Using such drives to control force is substantially more complicated. For example, a strain gage or other force measuring device must be implemented to provide a force feedback signal; and a force control loop is then used to control the operation of the screw drive such that the desired force is achieved and maintained. Providing a force control with such known drives is further complicated by force induced deflections that occur in the structure of the machine. Thus, obtaining the desired control over force with known drives is complex and expensive. Therefore, there is a need to provide a machine design by which not only is the position of the rotating tool controlled but the force applied to the tool is also controlled using simple, reliable and inexpensive components.

Another issue in the design of a stir welding machine is how to securely clamp the metal pieces during the welding process. Of particular concern is how to secure the edges of the metal pieces forming the joint to be welded. As will be appreciated, the plunging of the rotating tool into the metal pieces and the high friction forces created by the rotating shoulder on the surfaces of the metal pieces create forces tending to separate the pieces. Further, the heat generated in the process often results in the edges of the metal pieces bending or warping. Further, the thicknesses of the two metal pieces are often not absolutely identical resulting in the weld process tending to work the thicker metal piece more. As a result, an elaborate system of clamps is often used in which a series of clamps is located on both sides of the joint over its entire length. In other applications, a pair of rollers is rigidly connected to, and rotate with, the rotating tool, thereby continuously circling the tool as it is moved along the joint. As will be appreciated, if one metal piece is thicker than the other piece, the circling rollers are constantly hitting the raised edge of the thicker metal piece which may result in undesirable vibrations and wear. Further, with rigid roller axles, as one roller moves up and over the thicker metal piece, the other roller is lifted slightly from the thinner metal piece; and the roller contacting the thicker metal piece applies a greater force than the roller contacting the thinner metal piece. Thus, there is a need for a simple, reliable and inexpensive joint clamping mechanism that applies equal forces to both of the metal pieces even if one piece is thicker than the other piece.

The friction stirwelding process produces substantial heat in the metal pieces as well as in the rotating tool and adjacent machine components. The heat may be significant enough to adversely affect the performance or life of components adjacent the rotating tool, for example, the spindle bearings. Therefore, there is a need to provide a friction stir welding machine that limits the transfer of heat from the rotating tool and the welding area to other components of the welding machine.

It is common to clamp two metal pieces, weld a joint, clamp another piece and weld another joint. However, in many applications, it is more efficient to clamp more than two pieces on the welding machine at one time and then, successively weld each of the joints without having to handle individual pieces between the welds. In such an application, it is important that none of the metal pieces move during the welding process, so that all of the joints remain in their desired position ready to be welded. Thus, there is also a need for a relatively simple but effective system for clamping metal pieces to be welded in their desired positions. The work holding system should not only properly clamp the joint being welded, but an effective work holding system should permit a number of metal pieces to be mounted and clamped on a worktable so that a number of joints can be successively welded with minimum handling of the pieces.

SUMMARY OF INVENTION

The present invention provides a friction stir welding machine that moves the rotating tool both in and out of the metal pieces with the necessary forces, in an efficient manner and using economical machine components. The friction stir welding machine of the present invention has a clamping system that is easy to use and permits numerous parts to clamped such that a plurality of joints can be successively welded without handling the metal pieces. The stir welding machine of the present invention also maximizes the life of machine components by limiting the transfer of heat from the rotating friction stir welding tool. Thus, the friction stir welding machine of the present invention has the advantages of being economical to manufacture, easy to use and provides great productivity while consistently producing high quality welded joints.

In accordance with the principles of the present invention and the described embodiments, the friction stir welding machine of the present invention includes a table supporting parts to be welded and a frame extending over the table. A first drive is supported by a first element of the frame and is operatively connected to a spindle having a rotating tool. The first drive moves the rotating tool in a first direction, and the first drive disengages from the spindle after the rotating tool contacts the material. A second drive is supported by a second element of the frame and is operatively connected to the spindle forforcing the rotating tool into the parts at a joint, thereby initiating a friction stir welding process. This embodiment uses two drives and independent machine elements to react forces from those drives.

The dual drives and independent force reacting machine elements have the advantage of being able to control the displacement of the rotating tool, for example, with the first drive and to control the force applied on the rotating tool, for example, with the second drive. The force control system has the advantage of providing a direct control of force independent of deflections in the machine structure. Further, the independent displacement and force control systems are implemented with simple, reliable and relatively inexpensive components.

In one aspect of the invention, the friction stir welding machine includes a third drive mounted on the frame and operatively connected to the spindle for moving the rotating tool in a third direction along the joint between the parts to be welded.

In another embodiment, the friction stirwelding machine of the present invention has a pair of rollers mounted to a roller support with an axis of rotation substantially perpendicular to an axis of rotation of the rotating tool. The rollers contact surfaces of two parts to be welded in response to the rotating tool penetrating the parts to a desired depth. The roller support is pivotally mounted to the spindle, and the roller support has a pivot axis substantially perpendicular to both an axis of rotation of the rollers and the axis of rotation of the rotating tool. Thus, the pivoting action of the roller support has the advantage of applying equal forces to both parts even if the parts have different thicknesses.

In a further embodiment, the friction stir welding machine of the invention has a base, and first and second drives supported by the frame and operatively connected to a spindle having a rotating tool for moving the rotating tool in respective first and second mutually directions. A table supporting parts to be welded has a vacuum hold down system for securing the parts to an upper surface of the table. The vacuum hold down system has the advantage of being relatively simple, reliable and less expensive than mechanical clamping systems. In addition, more than two parts can be clamped to the table so that multiple welds can be successively made.

Various additional advantages, objects and features of the invention will become more readily apparent to those of ordinary skill in the art upon consideration of the following detailed description of the presently preferred embodiments taken in conjunction with the accompanying drawings.

BRIEF DESCRIPTION OF DRAWINGS

FIG. 2 is an end view in elevation of the friction stir welding machine of FIG. 1.

FIG. 3 is a partial perspective view of the vertical spindle drive of the friction stir welding machine of FIG. 1.

FIG. 5 is a perspective view of a pivoting roller truck mounted on the end of the spindle of the friction stir welding machine of FIG. 1.

FIG. 10 is a partial perspective view of the vertical spindle drive of the friction stir welding machine of FIG. 1 illustrating the drive disengaged from the spindle.

FIG. 15 is a table illustrating the thermal growth of a retractable pin tool string.

DETAILED DESCRIPTION OF THE INVENTION

Figure 7:
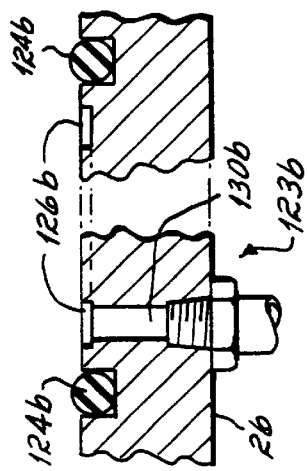
FIG. 7 is an exploded view of a portion of a vacuum system employed on the table illustrated in FIG. 6.

A friction stir welding machine 20 is comprised of a frame or gantry 22 and a base 24 extending therethrough. The base 24 supports a work table 26 that is manually slidable along the length of the base 24 in a generally horizontal direction. The work table 28 supports parts 28, 30, 31 secured adjacent each other to form joints 32, 33. Friction stir welding the metal parts 28, 30, 31 along the joints 32, 33 will secure the parts 28, 30, 31 together in a unitary piece. The gantry 22 has a pair of columns or uprights 34, 36 that are spaced outside of, but adjacent to, lateral side rails 38, 40 of the base 24. The columns 34, 36 are joined together by lower, intermediate and upper cross members or cross rails 42,44,46, respectively. An anvil 48 is rigidly connected to the top of the lower cross member 42. Each of the side rails 38, 40 is joined to the lower cross member 42 by a post 39 to connect the frame 22 and base 24 into a unitary structure. A spindle carriage or slide 50 is mounted to the intermediate cross member 44 by means of a pair of linear guides or bearings 52. The spindle carriage 50 is also operatively connected to a drive 54 providing motion of the linear carriage 50 in a generally horizontal direction substantially perpendicular to the longitudinal side rails 38, 40 of the base 24. The drive 54 can be of various known types, but the illustrated drive 54 is a five ton "ComDRIVE ACTUATOR" commercially available from Joyce Dayton of Dayton, Ohio. The drive 54 uses a jack or screw 56 having one end rotatably mounted in a bearing attached to the column 36. A nut (not shown) is attached to the rear side of the spindle carriage 50 in a known manner. The drive 54 further includes a source of power 58, for example, a three horsepower AC induction motor, that is coupled to an opposite end of the screw 56 by a mechanical coupling, for example, a worm gear 60 commercially available from Cincinnati Electric of Cincinnati, Ohio. The drive 54 is capable of providing a horizontal drive force of approximately 10,000 pounds.

A spindle or tool head 62 is slidably mounted to the spindle carriage 50 by linear guides or bearings 64. Referring to FIG. 2, a pair of linear guides 64 is used; and the guides 64 are positioned laterally on opposite sides of the spindle carrier 50. The spindle 62 is operatively connected to a second drive 65 for moving the spindle 62 in a generally vertical linear path substantially perpendicular to the spindle carriage guides 52 and the longitudinal side rails 38, 40 of the base 24. The second drive 65 can be of various known types, but the illustrated drive 65 has a screw 66 rotatably mounted at its upper end to the spindle carriage 50. Referring to FIG. 3, the spindle 62 is moved vertically by a nut 68 that carries a bracket 70 rigidly connected to the spindle 62. Referring to FIG. 2, a power source 72, for example, a one horsepower electric motor, is mechanically coupled to an upper end of the screw 66 through a gear box 74. Thus, rotation of the motor 72 and screw 66 is operative to move the nut 68 that carries the bracket 70 and spindle 62 in a generally vertical direction.

The spindle 62 is rigidly connected to a lower end of a pair of rods or brackets 76 that have upper ends connected to movable portions 77 of respective drive 78. The drive 78 functions as a weld force generator and is comprised of a pair of power actuators, for example, air stroke actuators Model No. 1T15S-6 commercially available from Firestone of Carmel, Ind. The air stroke actuators 78 have a desirable characteristic of having a limited stroke or displacement within their total range of displacement in which they apply a relatively constant force through that limited displacement. Thus, through that limited displacement, the force being applied by the actuators is a known, relatively constant magnitude and is applied independent of any deflections in the structure of the machine. The actuators 78 have movable portions 77 rigidly connected to a plate 80 that is slidably mounted to the upper cross member 46 by means of a linear guide 82. The linear guide 82 is located substantially along a longitudinal centerline of a lower surface 83 of the upper cross member 46. The linear guides 52, 64, 82 are known devices such as Tompson linear guides commercially available from Tompson of Port Washington, N.Y.

Figure 4:
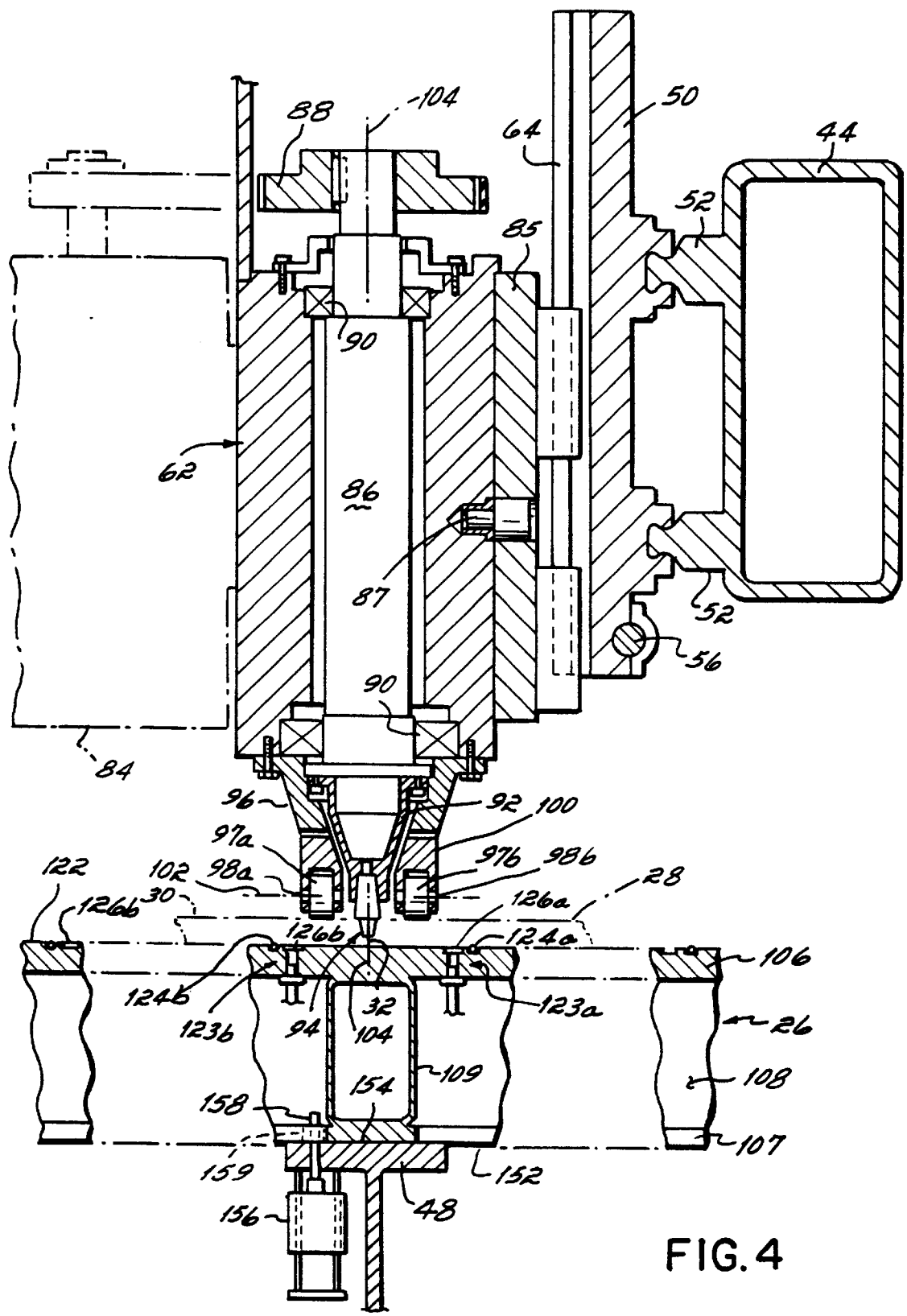
FIG. 4 is a cross-sectional view taken along line 3—3 of FIG. 1 illustrating the major components within the spindle of the friction stirwelding machine of FIG. 1.

Referring to FIG. 5, a rotating tool 94 is comprised of pin portion 93 that extends from a shoulder surface 95 substantially perpendicular to a centerline of the pin 93. Referring to FIG. 2, in a friction stir welding process, it is often desirable to orient the rotating tool 94 at a slight angle, for example, between one and five degrees, so that the centerline of the rotating tool is not perfectly perpendicular to the upper surface of the workpiece. This can be accomplished by rotating the spindle 62 clockwise through a small angle about an axis of rotation parallel to the side rails 38, 40. Referring to FIG. 4, the spindle 62 is pivotally mounted to a plate 85 by means of a pivot pin 87; and the plate 85 is mounted to the linear guides 64 on the spindle carriage 50.

Thus, the spindle 62 and rotating tool 94 can be angularly displaced, for example, up to five degrees, and clamped to the plate 85 by bolts or other means.

The rotating tool 94 is powered by a spindle motor 84, for example, a 25 horsepower motor commercially available from Cincinnati Electric mounted on the spindle 62. Referring to FIG. 4, the spindle motor 84 is rotatably coupled to an upper end of a spindle shaft 86 by means of a belt drive 88. The spindle shaft 86 is rotatably mounted in the spindle 62 by bearings 90. A tool holder 92 is mounted to a lower end of the spindle shaft 86, and a tool or pin 94 is mounted within the tool holder 92. The tool holder 92 is made from a material having a low thermal conductivity, for example, stainless steel, so that only minimal heat from the welding process and in the tool 92 is conducted to other components, for example, the bearings 90, of the spindle 62. A spindle cover 96 is also connected to the lower end of the spindle 62 and covers a portion of the lower end of the spindle shaft 86. Rollers 97a, 97b are rotatably mounted in a roller support or truck 100 on respective axles or pins 98a, 98b. Referring to FIG. 5, the lower end of the spindle cover 96 has a generally U-shaped clevis 101. The roller truck 100 is pivotally mounted within the clevis 101 of the spindle cover 96 by a pair of shoulder bolts 103 that extend through clearance holes in opposed arms of the clevis 101 and are threaded into opposite sides the spindle cover 96. One of the rollers 97a, 97b is located on each side of the tool 94 and the joint 32. Referring to FIG. 4, the rollers 97a, 97b contact the upper surfaces of the respective parts 28, 30. The rollers 97 turn about an axis of rotation 102 that is substantially perpendicular to the axis of rotation 104 of the tool 94 and substantially parallel to the longitudinal side rails 38, 40 (FIG. 1) of the base 24.

Figure 6:
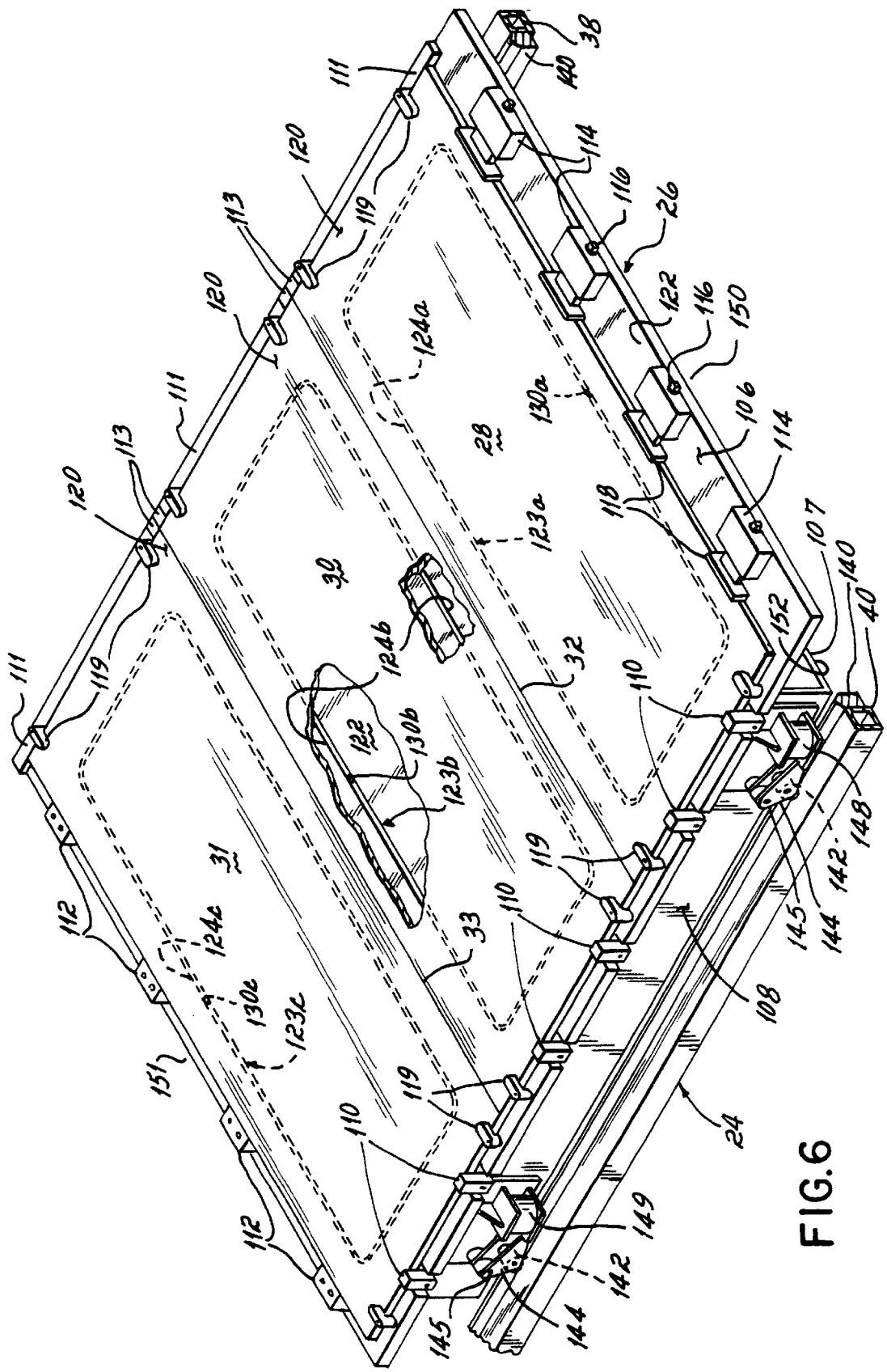
FIG. 6 is a perspective view of the work supporting table of the friction stir welding machine of FIG. 1.

Referring to FIG. 6, the work supporting table 26 is comprised of an upper plate 106, a lower plate 107 and sidewalls 108 that separate the upper and lower plates 106, 107. Crossbeams 109 (FIG. 4) extend between the upper and lower plates 106, 107 and the lateral sidewalls 108 at locations immediately below the weld joints 32, 33. The parts 28, 30, 31 are located on the table 26 by a lateral block or bar 111. The bar 111 is located on the side of the table 26 toward which the spindle 62 feeds during the welding process. Lateral clips 110 locate the parts 28, 30, 31 on a opposite side of the table. The part 31 is located at one end of the table 26 by blocks 112, and the part 28 is secured at the other end by clamps 114. The clamps 114 include a screw 116 that pushes a clamping element 118 against an end of the part 28. Thus, the clamps 114 are used to force the joints 32, 33 together. Clips 119 are located along the lateral edges of the parts 28, 30, 31 and extend over respective top surfaces 120 of the parts 28, 30, 31. The bar 111, clips 110, 119 and clamps 114 are principally used to locate the parts 28, 30, 31 at the desired position on the work supporting table 26.

The lateral bar 111 has gaps or cutouts adjacent the joints 32, 33 to be welded so that the rotating tool 94 can be moved past the bar 111. As will be appreciated, as the rotating tool leaves the ends of the joints 32, 33, material may blow out the side of the parts 28, 30, 31 ahead of the rotating tool, thereby reducing the consistency and quality of the weld at the end of the joints 32, 33. In order to maintain high quality welds throughout the joints 32, 33, one or more blocks 113 of the material being welded are secured in the gaps of the lateral bar 111. Thus, at the end of the joints 32, 33, the rotating tool passes through the blocks 113. The blocks 113 are then removed by machining; and the joints 32, 33 have a consistent and uniform weld throughout their entire length. The blocks 113 are secured in place by being fastened or attached to, or otherwise secured at, the lateral edge of the parts 28, 30, 31 at the ends of the joints 32, 33 in a known manner.

Figure 8:
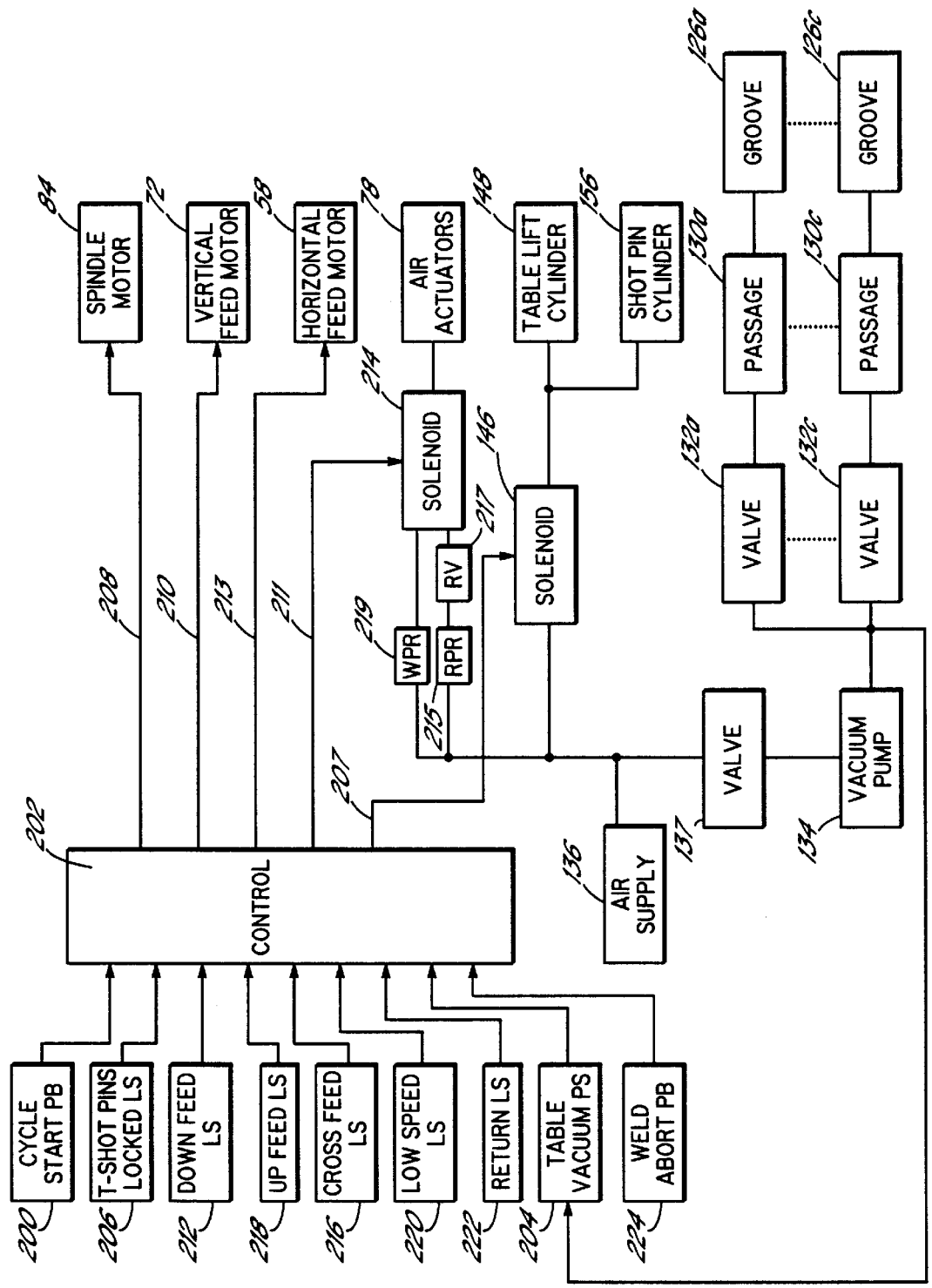
FIG. 8 is a schematic block diagram of a control system for the electrical and fluid operated devices on the friction stir welding machine of FIG. 1.

In FIG. 6, the table 26 has vacuum clamping systems 123a, 123b, 123c for each of the respective parts 28, 30, 31. The vacuum systems 123 are located in the top surface 122 of the table 26. The top surface 122 beneath the parts 28, 30, 31 has respective seals 124a, 124b, 124c. The seals form a closed loop or path inside the outer periphery of each of the parts 28, 30, 31. The seals 124 are also located as close as possible to the joints 32, 33 without being adversely affected by heat from the welding process. Inside the closed path of the seals 124a, 124b, 124c are respective vacuum channels 126a, 126b, 126c. FIG. 7 is an enlarged view of the vacuum system 123b and is exemplary of the construction of all of the vacuum systems 123. The seal 124b is disposed within a groove 128b in the upper surface 122 of the worktable 26. Immediately adjacent the groove 128b, but inside the closed loop of the seal 124b, is an air groove 126. The air groove 126b is connected to one end of respective supply passages 130b extending through the top plate 106 of the table 26. The other end of the supply passage 130b is in fluid communication with one side of a manually operated valve, for example, a ball valve 132b as shown in FIG. 8. The other side of the valve 132b is connected to a vacuum pump 134. Thus, for each of the parts 28, 30, 31, there is an independent and separately controllable vacuum system 123 comprised of a seal 124, an air groove 126, fluid passage 130 and valve 132. The valves 132a, 132b, 132c (FIG. 8) are connected to the vacuum pump 134 that, in turn, is driven from a source of pressurized air 136 such as that normally found in manufacturing environments. A master valve, for example, a ball valve, 137 is connected between the air supply 136 and the vacuum pump 134 to control the operation of the vacuum pump 134.

In use, referring to FIG. 6, using the clips 110, 119, stops 112 and clamps 114, the parts 28, 30, 31 to be welded are located on the top surface 122 of the table 26. Thereafter, via operator action, the appropriate ones of valves 132 (FIG. 8) are opened to permit a partial vacuum, that is, a pressure less than atmospheric pressure, to be pulled in respective grooves 126. The partial vacuum in the grooves 126 and any contiguous spaces between the bottom of the parts 28, 30, 31 and the top surface 122 of the table 26 provide a substantial force that firmly secures the parts 28,30, 31 to the top surface 122 of the worktable 26.

Referring to FIG. 6, the table 26 is supported by a pair of wheels 142 on each side of the table 26 that ride on two tracks 140 rigidly connected to the longitudinal side rails 38, 40. The wheels 142 are rotatably mounted to respective table lift arms 144 which are located near the ends of two opposed side walls 108 of the table 26. The table lift arms are pivotally mounted to respective pivot pins 145. The wheels 142 and tracks 140 often have a mating V-shaped cross-sectional profile that automatically centers the wheels 142 on the track 140. The wheels 142 and tracks 140 are commercially available from Bishop Wisecarver of Pittsburgh, Calif. Thus, the table 26 is manually movable along the tracks 140 to a desired position.

Figure 1:
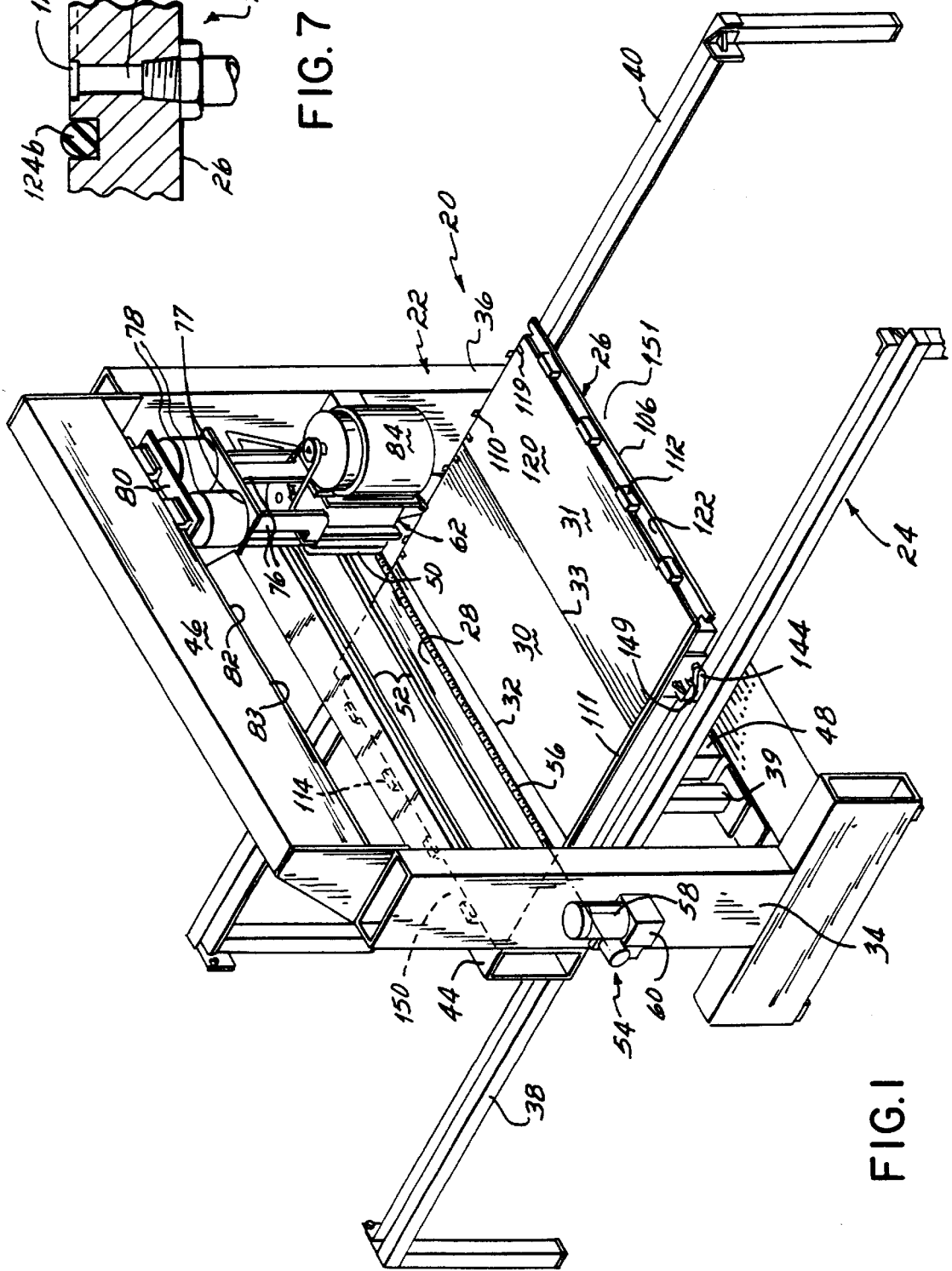
FIG. 1 is a perspective view of a friction stir welding machine in accordance with the principles of the present invention.

In order to weld the joint 32, the table 26 is manually moved along the rails 140 until the joint 32 is positioned over the anvil 48 (FIG. 1). Referring to FIG. 4, when the table 26 is properly positioned, the beam 109, which is immediately below the upper plate 106 of the table 26 and the joint 32, is positioned over the anvil 48. With the joint 32 located immediately over the anvil 48, referring to FIG. 2, a pair of cylinders 156 at each end of the anvil 48 are actuated by the operator to drive shot or locating pins 158 into registration holes 159 (FIG. 4) in the lower plate 107 of the table 26. The shot pins 158 function to precisely position the worktable 26 with respect to the rotating tool 94. In a known manner, one of the registration holes is cylindrical while the other of the registration holes is slightly elliptical with the major axis being parallel to the anvil 48. Thus, the table is aligned parallel to the anvil 48 but can shift slightly transversely to accommodate the location of the wheels 142 (FIG. 6) on the V-shaped track 140.

Referring to FIG. 8, the shot pin cylinders 156 are operated by a solenoid 146 which also, at the same time, operates a pair of cylinders 148 (FIGS. 1 and 6) on each side of the table 26 close to the forward end 150 and a pair of cylinders 149 on each side of the table close to the rear end 151. Operating the cylinders 148,149 moves the respective lift arms 144 downward, thereby lowering the table 26. Lowering the table 26 brings the bottom surface 152 (FIG. 4) of the table 26 in contact with the top surface 154 of the anvil 48 with the pins 158 properly aligned in the holes 159. Thus, the beam 109 and anvil 48 react all of the vertical forces imposed on the parts 28, 30 in friction stir welding the joint 32. Even though the cylinders 148, 149, 156 are operated at the same time, it is important that the shot pins 158 are fully extended in the registration holes 159, thereby properly aligning the table 26 before the table comes to rest on top of the anvil 48. Thus, bleed adjustments on the cylinders 148,149,156 are set such that the cylinders 156 fully extend the shot pins 159 before the cylinders 148,149 lower the table 26 onto the anvil 48.

Figure 9:
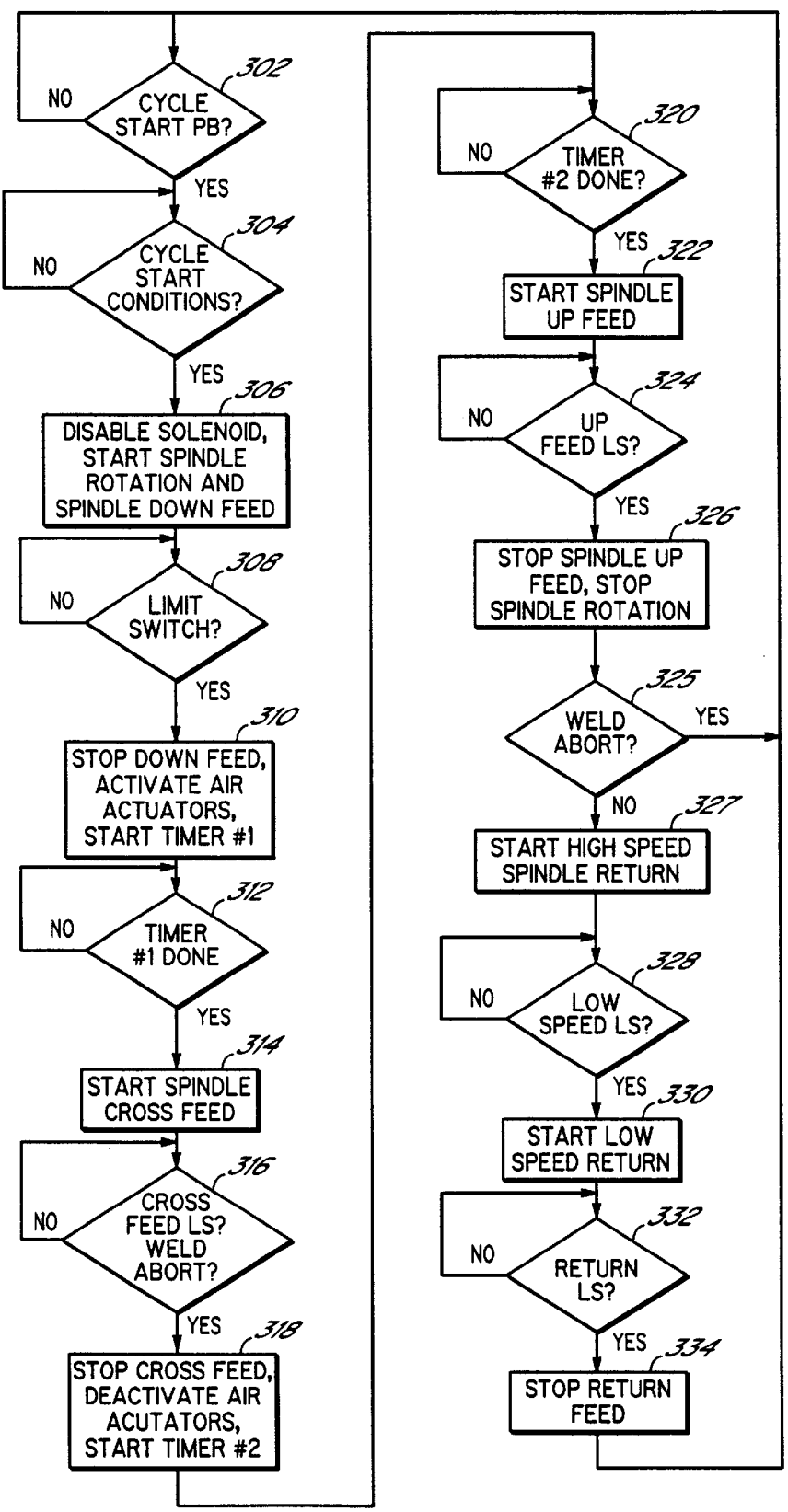
FIG. 9 is a flowchart illustrating a welding cycle using the friction stir welding machine of FIG. 1.

Once the worktable 26 is properly positioned with the joint 32 directly over the anvil 48, a friction stir welding process is initiated. Referring to FIG. 8, upon an operator activating a cycle start button 200, a signal is provided to a control 202. There are many commercially available controls suitable of this purpose, and one such control is a GE Fanuc programmable logic controller commercially available from Cincinnati Electric of Cincinnati, Ohio. In order to execute a welding cycle, the control 202 initiates a process as illustrated in FIG. 9 by which friction stir welding a joint is accomplished.

After determining, at 302, that a cycle start push button has been depressed, the control, at 304, checks whether the friction stir welding machine is in the appropriate state to execute a friction stir welding process. For example, the control 202 will check the state of a table vacuum pressure switch 204 to determine if the desired vacuum exists, for example, 25 inches Hg. Next at 304, the control 202 checks the states of the shot pin limit switches 206 that change state when the shot pins are fully extended into the table 26. For purposes of this description, a limit switch refers to any electrical/mechanical device that provides a feedback signal indicating that a desired position has been achieved by the component being monitored. If the shot pins are in their desired position in the table 26, the control 202 then, at 306, disables solenoid 146. The control 202 provides a signal over an output 207 to solenoid 146 which electrically clamps or locks the solenoid 146 in its current state. That prevents the solenoid 146 from being erroneously or inadvertently switched during the welding process.

At process step 306 (FIG. 9), the control 202 also provides a command signal over output line 208 to start the spindle motor 84, thereby rotating the tool 94 at the desired rate, for example, 700 revolutions per minute. The control 202 further provides a command signal over line 210 to initiate operation of the vertical feed motor 72 in a direction causing the screw 66 to move the spindle 62 downward toward the joint 32 to be welded. The control 202 then, at 308 of FIG. 9, detects the state of a downfeed limit switch 212. As previously mentioned, the downfeed limit switch 212 can be any device mechanical or electrical that provides a feedback signal indicating that the monitored device, for example, the spindle 62, has been moved downward to its desired position.

Referring to FIG. 3, as the screw 66 rotates, the nonrotating nut 68 carrying the bracket 70 moves linearly from its raised position downward toward a lower end of the screw 66, thereby lowering the spindle 62 and the rotating tool 94. It should be noted that as the nut 68, bracket 70 and spindle 62 are moving vertically downward, referring to FIG. 2, the brackets 76 connected at one end to the spindle 62 are also moving downward and pulling with them movable portions 77 of the actuators 78. Thus, the movable portions 77 of the actuators 78 must have a range of travel equal to the expected range of vertical travel of the spindle 62.

When the rotating tool 94 contacts the joint 32 formed by the parts 28, 30, the control 202 continues to command the operation of the vertical feed motor 72; and referring to FIG. 10, the nut 68 continues to feed downward with respect to the bracket 70. As the nut 68 loses contact with the bracket 70, the load of the spindle 62 is no longer being carried by the nut 68, but instead, is being carried by the rotating tool 94. The motor 72 continues to rotate the screw 66 until the nut 68 achieves its desired position as detected by a downfeed limit switch 212. The desired position of the nut 68 is a vertical distance or displacement below the bracket 70 that is equal to the thickness of the weld joint 32 plus some clearance value. The thickness of the weld joint is normally equal to the length of the rotating tool 94 or the stroke of penetration of the rotating tool 94 into the joint 32. The nut 68 generally does not rest on the shoulder bolts 69, but the shoulder bolts 69 will catch, and limit the displacement of, the nut 68 in the event that the screw 66 or some other component breaks.

Upon the control 202 detecting a change of state of the downfeed limit switch 212 indicating that the nut 68 is in its desired position below the bracket 70, the control 202 at 310 of FIG. 9, provides a command signal on output 210 to stop the operation of the vertical feed motor 72. At the same time, the control 202 provides a command signal over line 211 to operate a solenoid 214 providing a regulated, higher pressure air to the actuators 78. When the actuators 78 are not activated, pressurized air from an air supply 136 is applied to a retract pressure regulator 215 and a pressure relief valve 217. The pressure regulator is set to a lower pressure, for example, 20 psi, and the relief valve is set to a slightly higher pressure, for example, 22 psi. The pressurized air is also supplied to a weld pressure regulator 219 which provides a higher, regulated air pressure, for example, 93 psi to the solenoid 214. The command signal causes the solenoid 214 to apply the higher pressure air from regulator 219 to the actuators 78.

The control 202 also activates or starts a first internal timer. The timer provides a first delay period, for example, approximately 20 seconds, during which operation of the air actuators 78 causes the movable portions 77 of the actuators 78 to be moved downward by the pressurized air. The downward motion of the movable portions 77 of the actuators 78 applies a large force through the bracket 76, the spindle 62 and the rotating tool 94 of approximately 11,000 pounds. That force, in addition to the force provided by the weight of the spindle, is described herein as a weld processing force, and that force pushes a full length of the rotating pin 93 in the solid metal of the parts 28, 30 adjacent the joint 32 and maintains the rotating shoulder 95 in contact with the upper surfaces of the parts 28, 30.

Thus, the use of the dual drives 65, 78 and their respective reacting cross members 44, 46, provides optimum performance of those components as well as the friction stirwelding machine itself. Further, the drive 65 is designed to simply position the tool 94 when it is not engaged in the welding process, and components, such as a screw drive, normally used for such purposes are utilized. However, the drive 78 can be optimized to simply provide the necessary force without any concern for the displacement of the tool 94 which is controlled by the rollers 97. Thus, actuators 78, which are relatively inexpensive, are chosen to provide a relatively constant force of the desired magnitude over the limited stroke of the actuators that is required to move the rotating pin 93 into the parts 28, 30 and maintain the rotating shoulder 95 against the parts 28, 30. Further, that relatively constant force is applied independent of any deflections normally occurring in the machine structure.

In addition, the large weld processing forces are reacted through the center of the bottom side of the upper cross member 46 and thus, reacted through the centerline of the cross member 46 and the other components of the frame 22. Hence, those very large processing forces do not have a moment arm with which to apply a torque to the components of the frame 22 or a shear load to cause vertical deflection. In contrast, known designs apply a weld processing force with a drive mounted on a side of a machine cross member similar to the intermediate cross member 44, the application of the large processing forces on the side of a cross member can create a substantial torque within the cross member.

The current design has a further advantage of disengaging the nut 68 of the drive 65 from the bracket 70, and hence, the weld processing forces generated by the actuators 78 are independent of the drive 65. By removing the very large weld processing forces from the screw 66 and nut 70 of the drive 65, the size of the drive 65 is subject to less wear.

As the actuators 78 force the rotating pin 93 into the parts 28, 30 adjacent the joint 32, referring to FIG. 4, the rollers 97a, 97b contact the upper surface of the parts 28, 30 on either side of the joint 32. The continued application of the weld processing force by the actuators 78 causes the rollers 97 to apply that weld processing force against the parts 28, 30 adjacent the weld joint 92, thereby providing a significant clamping force against the parts 28, 30 at locations adjacent the joint 32. That force is transmitted through the worktable 26 via the beam 109 of FIG. 4 to the anvil 48. Further, the weld processing force applied by the actuators 78 is reacted by the upper cross member 46 of the frame 22. If the parts 28, 30 have slightly different thicknesses, the roller truck 100 pivots so that the force applied by roller 97a against the part 30 is the same as the force applied by roller 97b against part 28. Further, by pivoting to accommodate different part thicknesses, the roller support 100 lowers slightly so that the depth of the weld is averaged as a function of the difference in thicknesses of the parts 28, 30.

Upon detecting the expiration of the first timer, at 312 of FIG. 9, the control 202 then, at 314, provides a command signal over line 213 (FIG. 8) to operate the horizontal feed motor 58. The horizontal feed motor rotates the screw 56 in a direction causing the spindle carrier 50 and spindle 62 to traverse the rotating tool 94 through the joint 32, and plasticized metal passes around the rotating tool, thereby bonding the adjacent edges of the parts 28, 30 along the joint 32. After the plasticized metal cools and hardens, the parts 28, 30 are solidly welded together. The operation of the horizontal feed motor continues until the control, at 316 (FIG. 9), detects a change of state of a cross feed limit switch 216 (FIG. 8). The cross feed limit switch 216 changes state when the spindle carrier 50 and spindle 62 have been moved across the worktable 26 to the end of the joint 32. At that point, at 318 (FIG. 9), the control 202 changes the state of the command signal to the horizontal feed motor 58, thereby stopping the horizontal feed motor 58 and the horizontal travel of the spindle carrier 50 and spindle 62.

In addition, the control 202 changes the state of the signal on line 211 and the state of the solenoid 214, thereby connecting the low pressure air from the regulator 215 to the actuators 78. The control 202 also actuates a second internal timer providing a second time delay, for example, a five second delay. During that second time delay, air bleeds from the actuators 78, and the weld processing forces are removed from the spindle.

Upon detecting, at 320, the expiration of the second time delay, the control 202 provides a signal on line 210 to the vertical feed motor 72 commanding the vertical feed motor to rotate the screw 66 in a direction causing the nut 68 to move vertically upward, thereby lifting the bracket 70 and spindle 62 vertically upward. Upon detecting, at 324, a change of state of the upfeed limit switch 218 indicating that the spindle 62 is located at its desired uppermost position, the control 202, at 326 of FIG. 9, provides a command signal over line 210 to stop the operation of the vertical feed motor 72. In addition, the control 202 provides a signal over line 208 commanding the spindle motor 84 to stop. Next, assuming that there is no weld abort condition as detected at 325, the control 202 at 327 then provides a signal over line 213 commanding the horizontal feed motor 58 to operate the ball screw 56 in a direction causing the spindle carrier 50 and spindle 62 to move back toward their starting positions at a high velocity. The control 202, at 328 of FIG. 9, detects a change of state of a low speed limit switch 220 indicating that the spindle carrier 50 and spindle 62 are at a location at which a lower velocity motor operation should be initiated. The controller 202, at 330, then provides an output signal over line 213 commanding the horizontal feed motor 58 to operate at the desired lower velocity. The spindle carrier 50 and spindle 62 continue to move toward their starting positions until, at 332 of FIG. 9, the control 202 detects a return limit switch 222 changing state indicating that the initial positions have been achieved. The control then, at 334, provides a command signal over line 213 to stop the operation of the horizontal feed motor 58.

As will be appreciated, any attempt to stop the welding process by simply shutting off the power while the rotating tool 94 is in the weld joint results in the plasticized metal hardening around the tool 94. Extracting the tool 94 from the partially welded parts 28, 30 is difficult, time consuming and takes the machine out of production. Therefore, the control 202 includes a weld abort cycle which can be initiated by an operator using a weld abort pushbutton 224 or can be automatically initiated by the control 202 in response to a process condition, for example, a loss of vacuum as detected by the table vacuum pressure switch 204. A weld abort condition is detected at 316 of FIG. 9, and if a weld abort condition exists, the control 202 executes the process of steps 318–326 as previously described. Thus, the cross feed is stopped; the spindle is moved up from the parts 28, 30 and the spindle is stopped. The weld abort condition is detected by the control at 325, and the control process is stopped. The rotating tool has thus been automatically removed from the weld joint 32 and the spindle stopped in an orderly procedure.

While the present invention has been illustrated by a description of various preferred embodiments and while these embodiments have been described in considerable detail in order to describe the best mode of practicing the invention, it is not the intention of Applicant to restrict or in any way limit the scope of the appended claims to such detail. Additional advantages and modifications within the spirit and scope of the invention will readily appear to those skilled in the art. For example, in the described embodiment, while the drive 78 functioning as a weld force generator is identified as a pair of a particular type of air actuator, as will be appreciated, the drive 78 or weld force generator can be implemented with any type and number of actuators that provides the desired weld processing force. Further, the actuators 78 can be powered by electricity or a pressurized fluid such as air or a hydraulic fluid. Further, the drives 54, 65 are described as screw drives; however, as will be appreciated, the drives 54, 65 can be implemented with a fluid drive, for example, a hydraulic cylinder, a rack and pinion drive, a chain drive, a cable drive, etc.

Figure 11:
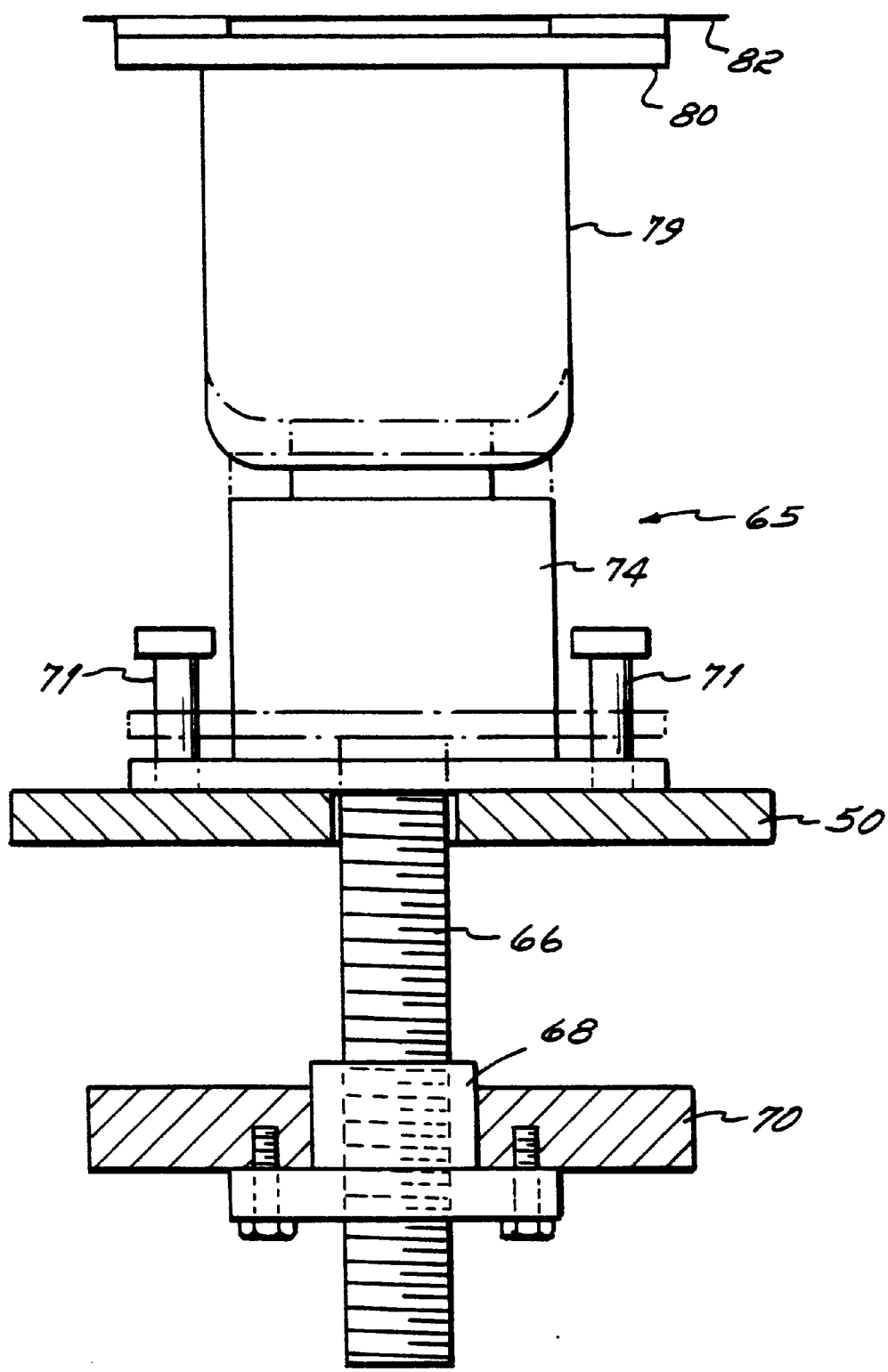
FIG. 11 is a diagrammatic cross-sectional view of an alternative embodiment of the a displacement drive and a force drive for the rotating tool.

In the described embodiment, the vertical drive 65 is disengaged from the spindle 62 by allowing the nut 68 to drop out of a bracket 70 after the rotating tool 94 contacts the workpiece. Further, the drive 78 is connected to the spindle 62 and thus, the actuator 78 must have a range of motion equal to the full vertical travel of the spindle 62. In some applications, finding an actuator 78 that provides a substantially constant force over that full range of motion may be difficult. As will be appreciated, there are other machine constructions that provide a weld process force generator and reacting force structure that is separate from a tool positioning drive. For example, referring to FIG. 11, in one alternative embodiment, the gear box 74 is mounted on the spindle carriage 50 with shoulder bolts 71. Further, an actuator 79 functioning as a welding force generator is mounted to the gear box 74; and in contrast to the earlier described embodiment, the nut 68 is rigidly connected to the bracket 70. The shoulder bolts 71 permit the gear box 74 to be moved upward and off of the spindle carriage 50 through a displacement that is at least equal to the expected displacement of the actuator 78. As the screw 66 is rotated to lower the bracket 70 carrying the spindle, the rotating tool contacts the parts as previously described. However, since the nut 68 is fixed to the bracket 70 and the nut 68 is then fixed in elevation by the tool contacting the part, continued rotation of the screw 66 will lift the gear box 74 off of the spindle carriage 50. When the actuators 79 are operated, they push the screw 66, nut 68, bracket 70 and the attached spindle and rotating tool downward until the rollers contact the parts as previously described.

With this alternative embodiment, the movable portion of the actuator 79 does not move through the entire range of motion of the spindle, but instead, the movable portion of the actuator 79 only has to move through a stroke that is necessary to force the rotating tool into the workpiece, that is, the length of the rotating pin. This embodiment also has a force limiting function. If one of the rollers 97 moves over a bump caused by a variation in the thickness of a part 28, 30 or a chip on the surface of a part 28, 30, the roller will move vertically upward. Since the gear box 74 is floating on the spindle carrier 50, as the roller rises, the spindle 62, bracket 70, nut 68 screw 66, and gear box 74 also rise. Thus, the reactive force is always equal to the applied weld processing force. In addition, with this alternative embodiment, it is possible to maintain the actuator 79 activated all the time, that is, powered so that it is continuously providing the weld processing force. However, this embodiment transmits the weld processing forces through the screw 66 and nut 68; and therefore, they would be subject to more wear than in the earlier described embodiment.

The friction stir welding machine 20 described with respect to FIG. 1 is a vertical spindle machine, in which the friction stir welding processing forces are supplied by cylinders 78. Those processing forces are reacted by a member 46 that is separate from the member 44 that supports the spindle drive components. Further, the work supporting member 42 and members 44,46 are connected at their ends by uprights or columns 34, 36 to form the gantry or frame 22. The above concept can also be applied to a horizontal spindle machine as shown in FIGS. 12–20 that also includes a further embodiment in which a retractable pin is used in the tool.

Structure

Figure 20:
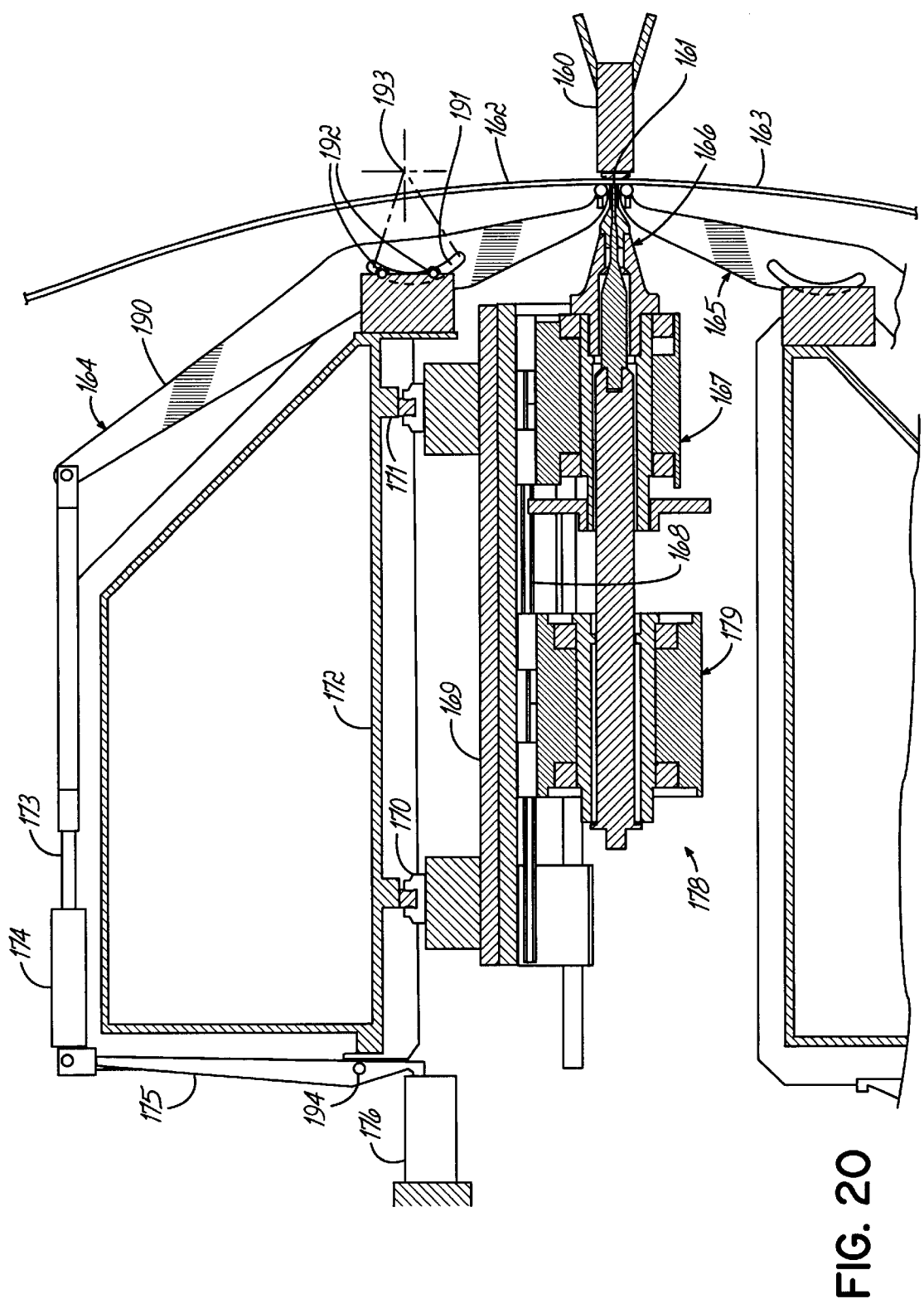
FIG. 20 is a cross-sectional top view of a barrel clamping system used on a horizontal spindle friction stir welding machine.

Referring to FIG. 20, an anvil column 160 is located rearward of left and right panels 162,163 and supports a joint 161 between the panels 162, 163. Distal ends of left and right clamp systems 164, 165, respectively, contact edges of the joint 161 on a forward side of the panels 162, 163. A rotatable friction welding tool 166 is plunged into the joint 161 by a spindle block 167 and a retractable pin tool block 179 that are mounted for linear motion on linear guides 168. The linear guides 168 guide motion of the spindle block 167 supporting the friction stir welding tool 166 and the retractable pin tool block 179 in a first direction toward and away from the column 160. The linear guides 168 are mounted on a spindle head or plate 169 that, in turn, is mounted on linear guides 170 that guide motion of the friction stir welding tool 166 along a length of a column 172 and along the joint 161. Stationary rails 171 of the linear guides 170 are mounted to the column 172 located forward of the joint 161. The friction stirwelding process is performed substantially identically as earlier described with respect to FIGS. 1–11.

Figure 12A:
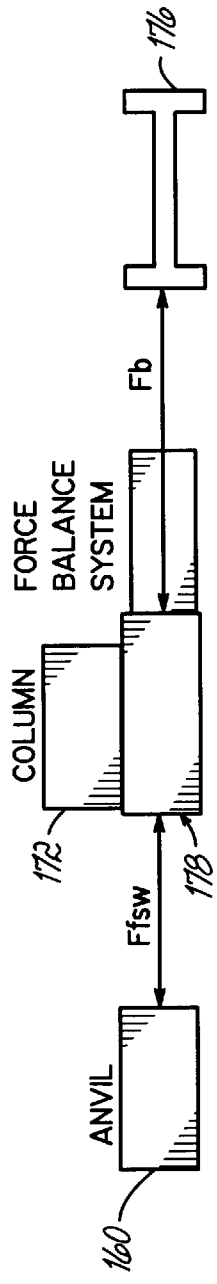
FIGS. 12A and 12B are respective diagrammatic top and side drawings of the force control system for a horizontal spindle friction stir welding machine in accordance with the principles of the present invention.
Figure 12B:
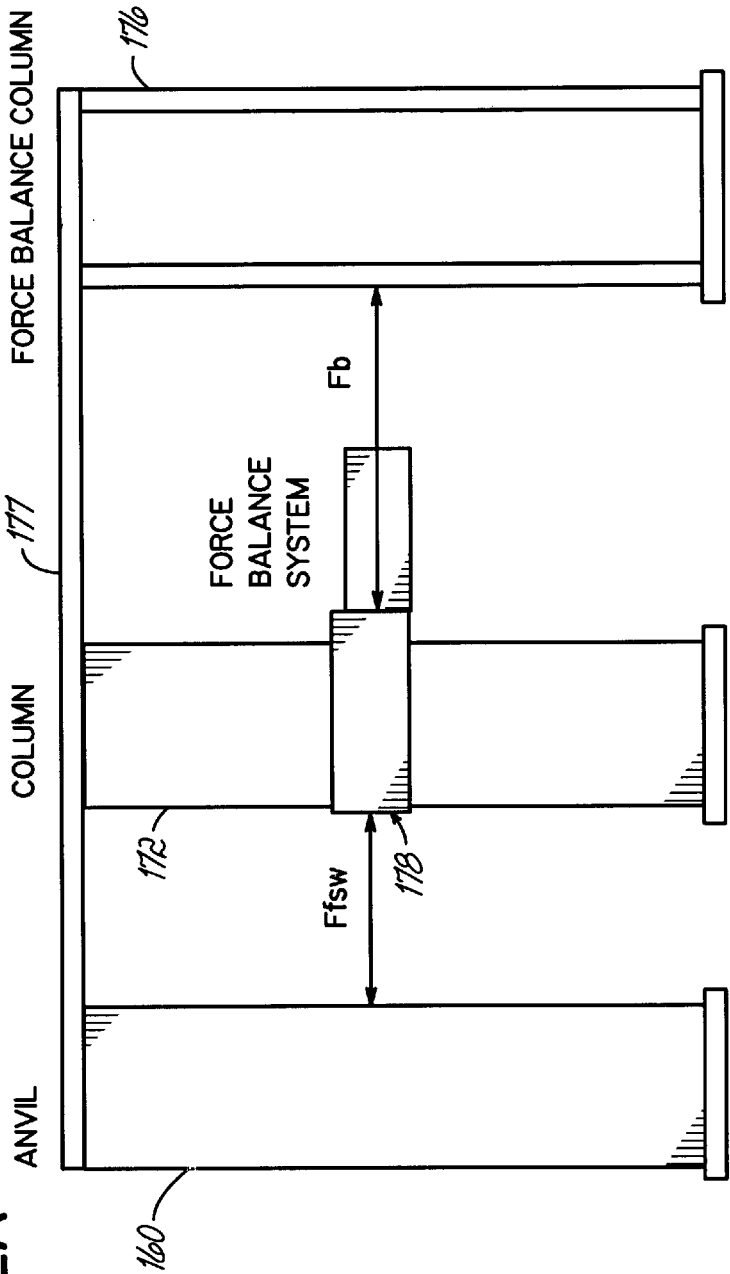

Referring to FIGS. 12A and 12B, in this embodiment, there is a weld window of about 274 inches extending along the length of the anvil column 160, and deflection from the applied force is limited to about 0.020 of an inch. A conventional approach requires a structure of significant cross section to achieve this deflection under both welding and clamp loads. A "force-balanced" structural approach is used in which the guiding structures (which need to exhibit limited deflection for performance reasons), for example, the column 172, can be isolated from the large forces of friction stir welding. Referring to FIG. 12, inexpensive, reliable controllable force technology is used to pass the large, static process or plunge forces to inexpensive, compact members designed to carry forces within the strength considerations of the specification, but are free to deflect as they will.

Firestone "Airstroke" actuators are used to generate friction stir welding process or plunge forces in the same manner as the Firestone actuator 78 of FIG. 1. The actuator inflation pressures are controlled by an electronically controlled digital air pressure regulator. These actuators, which are commonly used in trucks and busses as air suspension components, are very inexpensive, exhibit essentially no friction, and have essentially constant effective area over a significant range of deflection. A loadcell in series with the airstrokes can be used to create a closed loop on the counterbalance force, and the accuracy of the force control will approach the accuracy specifications of the loadcell. The upper ends of the anvil 160, column 172 and force-balancing column 176 are rigidly fixed or connected together by a tie bar or link 177. Thus, the force-balancing column 176 provides a counterbalancing force to react the friction stir welding plunge force. Further, if the friction stirwelding process or plunge force and the counterbalancing force provided by the force-balance system are equal, the sum of the forces on the column 172 is zero. Further, if the counterbalancing force Fb is colinear with the friction stir welding process force, then the sum of the moments on the column 172 are zero.

The force-balance approach is used to mitigate/eliminate deflection issues for both friction stir welding process forces and clamping forces. While there can be an advantage in this concept for system cost, the biggest advantage is in reshaping the structures to simplify their production and to improve access to the weld area for ease in setting up panels, clamping and checking fitup before welding. The clamping and friction stir welding structures (those inside the barrel for the ISL) are force-balanced, and the anvil column 160 is a conventional high-inertia bending member. The anvil column 160 can be force-balanced and exhibit essentially zero deflection under clamping and friction stir welding loads. The anvil column 160 has no design issues to encourage asymmetry or more compact sections.

Tompson linear guides, or the equivalent, are used for all linear axes. Depending upon loads imposed, and other factors, either the linear roller or linear ball guides can be used. These linear guide carriages are connected to an automatic lubrication system, and fitted with wiper/seals.

Figure 13:
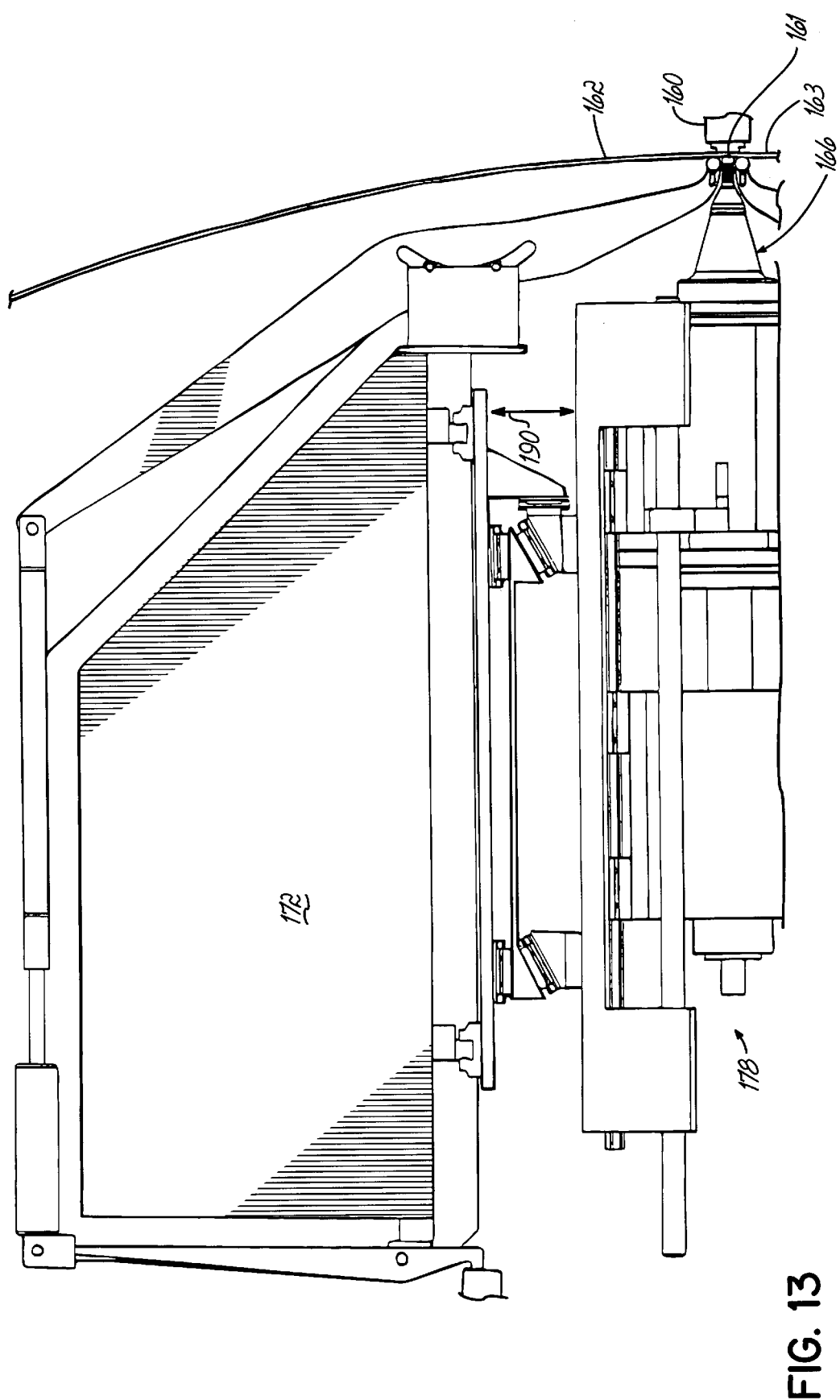
FIG. 13 is a diagrammatic side view of the cross-axis way for the friction stir welding machine of FIGS. 12A and 12B.

The cross slide axis shown in FIG. 13 is the only servo axis of motion. Cross axis motion indicated by the arrows 190 is achieved by using four 45 degree wedge blocks, carrying linear ways, located between the plunge axis ways and the weld tilt joint. A linear actuator, for example, a roller screw, forces a plate carrying the wedges back and forth. A second pair of linear ways, perpendicular to the ways carrying the wedge blocks constrains the plate carrying the plunge ways to motion perpendicular to the plunge ways. Since the linear ways exhibit such low friction, cross axis forces from the process are reacted by the roller screw; and a single load cell at either attachment of the rollerscrew senses forces in the cross axis direction.

The weld head tilt mechanism consists of two ground plates with a large pivot pin in the side nearest the weld tool. Bolts to fasten and clamp the plates together penetrate 10 degree arc slots in the clearance plate. Either a set of vernier holes for a pin, or a set of serrated surfaces with a 0.125 degree pitch and associated clamps, are used to lock the plates together at the desired angle. An absolute linear transducer (Baluff) measures the angle.

This friction stir welding system supports repositioning of the barrel segments around the tool without retracting the ISL in-the-barrel components. The inner longeron ribs are cleared by sufficient retraction of the clamps, and the outer longeron lugs are cleared by retracting the anvil beam.

Spindle

Figure 14:
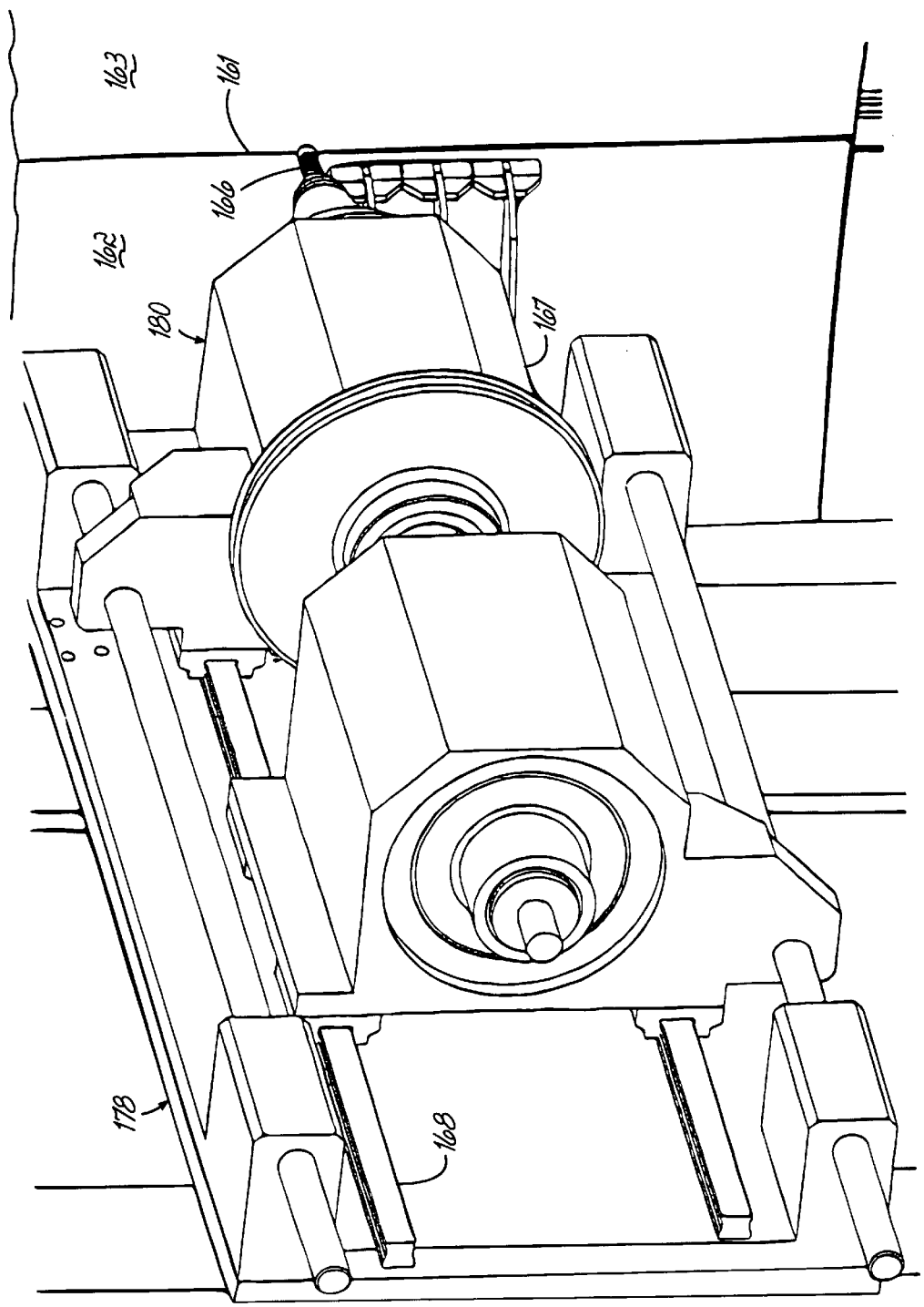
FIG. 14 is a diagrammatic perspective view of the overhung spindle on the friction stir welding machine of FIGS. 12A and 12B.

An overhung spindle head 178 as shown in FIG. 14 supports a retractable pin tool system 180 that has a spindle block 167 for supporting a friction stir welding tool 166 and a retractable pin tool block 179. With the force-balanced approach, there is no penalty for asymmetry. This overhung design is more accessible for maintenance, inspection and operation. It also allows the guiding ways to be machined in a single setup of a simple box beam.

The spindle bearings are a tapered roller bearing in the spindle nose, with a cylindrical roller and spring-loaded thrust bearing in the tail of the spindle. Operating loads are always in one direction, forcing the spindle into the housing, and this combination works well for that situation. A Timken 93800 cone/93125 cup combination, (8.000" bore/12.500

OD) has an $L_{10}$ thrust load rating of 35,500 lbs, providing 3,000 hours of life at 500 rpm. If a simple thrust load of 17,600 1bs. is applied and the bearing runs at 500 rpm, the 90% probability life is 30,000 hours. Grease lubrication is adequate for friction stir welding speeds, but the 1500 rpm machining speed may require other measures. The bearings at the tail of the spindle have minimal load for their size. Axial preload using a thrust bearing is provided by belleville washer(s). Final drive to the spindle is a timing belt.

An AC vector controlled spindle motor supplies the stir weld spindle power. The motor has to be adequate to supply 20 hp to the spindle at 500 rpm to meet the 200 ft-lb torque requirement from 100 rpm to 500 rpm. The motor has to be able to run the spindle at 1500 rpm for machining. Allen-Bradley offers motor-drive combinations that can meet these requirements, with appropriate mechanical transmission selection.

The toolholder that grips the shoulder portion of the FSW tool is a unique and important component. It must transmit considerable forces and moments, and it needs to be an effective barrier to heat transfer out of the tool and into the spindle shaft and bearings. The FSW machine utilizes a thin walled cone of 300 series stainless steel, which meets these needs quite well. The stainless cone has another desirable attribute, that being, minimal axial length change with tool heating. The machine has load control to mitigate this concern, but it is still desirable to minimize the uncertainty in tool string length as the tool and tool holder go through the thermal transient at the start of the weld. This is achieved with an improvement to the stainless cone holder, which arranges the structural elements with the large temperature gradient into a radial orientation. As the heat barrier comes into thermal equilibrium, the change in length and the uncertainties in change are driven into radial and torsional deformation of the component rather than a change in length. In addition to this geometry change, change of the material from stainless to Titanium 6A1-4V offers advantages in both lower thermal conductivity and coefficient of thermal expansion.

Retractable Pin Tool System

Figure 16:
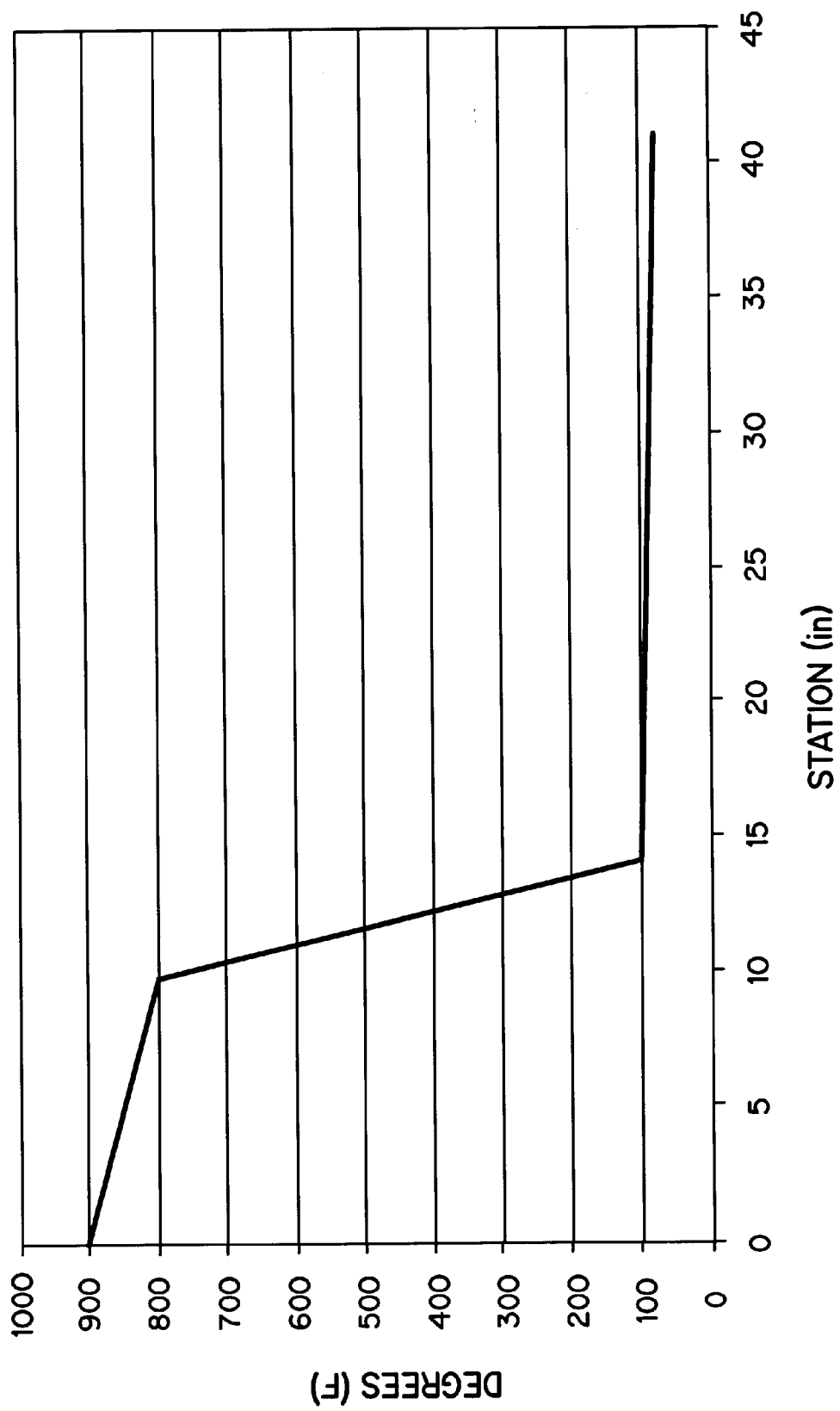
FIG. 16 is a graph of the temperature profile of the retractable pin tool string.
Figure 17:
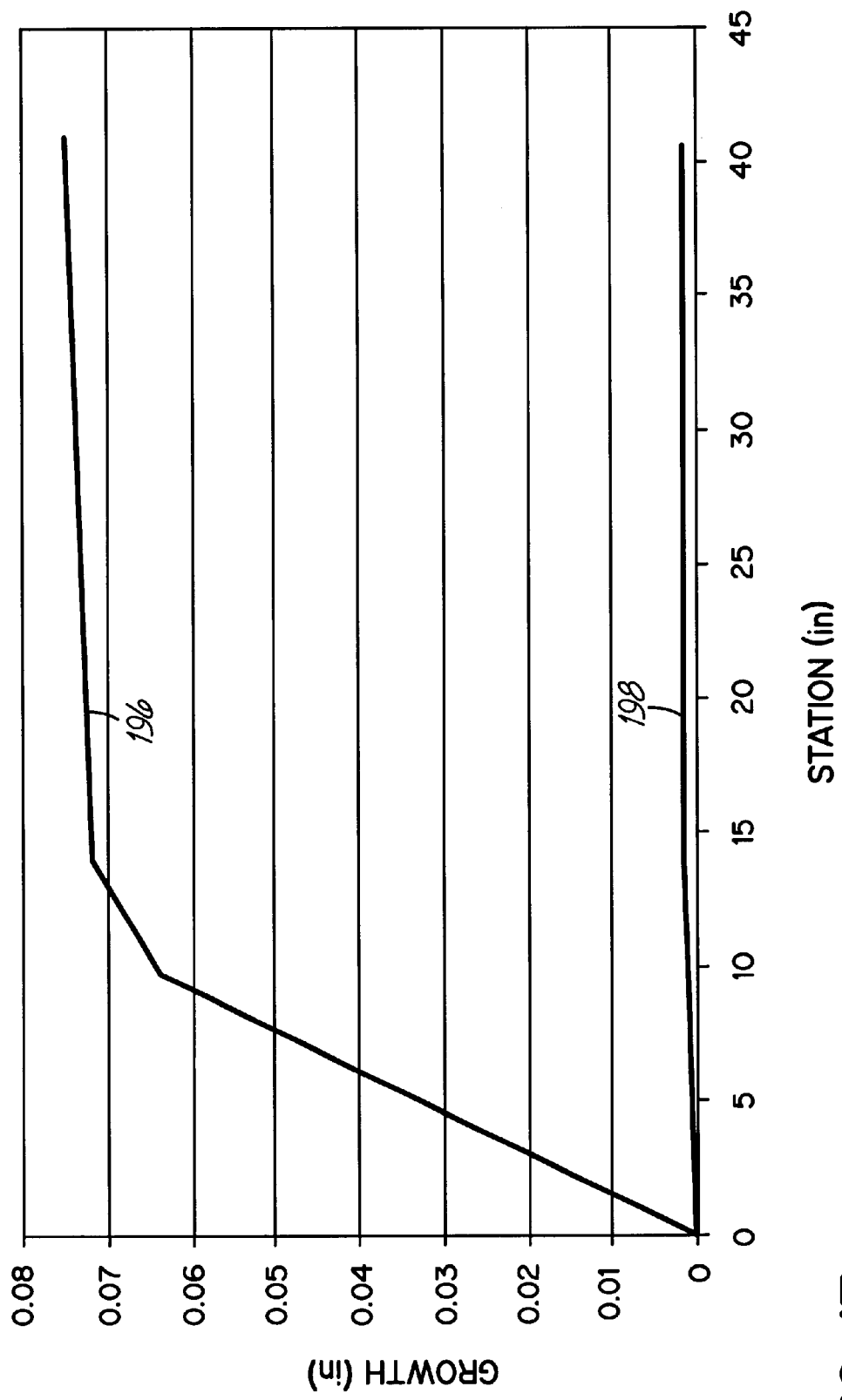
FIG. 17 is a graph of the thermal growth of the retractable pin tool string elements.
Figure 18:
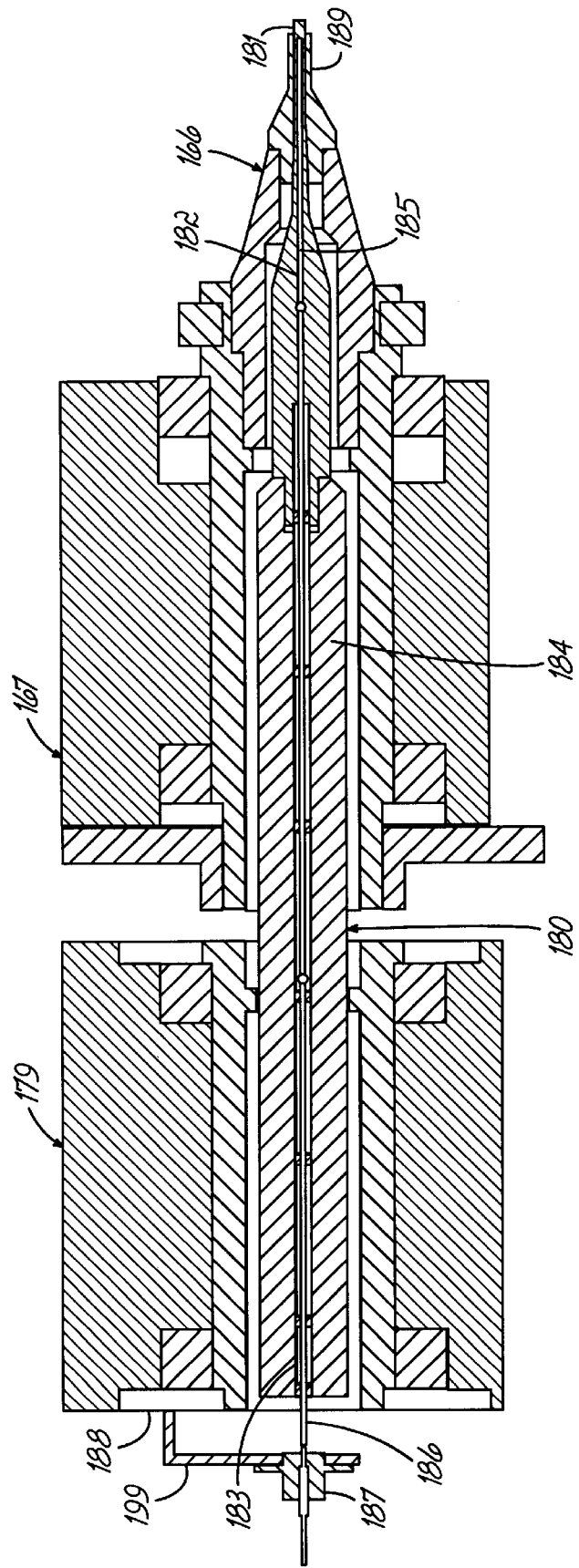
FIG. 18 is a centerline cross-sectional side view of a spindle with a friction stir welding tool having a movable pin tool with a growth measurement system.

The challenge in using a retractable pin tool to produce quality welds is that the thermal growth of the pin tool from room temperature to equilibrium condition is about 0.030–0.080" as shown in the table of FIG. 15. A temperature profile of the spindle string starting at the tip of the friction stir welding tool 166 is shown in FIG. 16. The thermal growth over the length of the pin tool string as set forth in column 195 of FIG. 15 is shown by curve 197 in FIG. 17. The present invention measures the growth of the pin tool string in real time in the weld, and tracks mechanical deflections as well. To accomplish this, referring to FIG. 18, a blindhole 182 (about 0.125" Dia.) is drilled (or EDM-ed) over the length of the pin tool 181; and through hole 183 is drilled in a pin tool bar 184. One or more glass-ceramic or fused quartz measuring rod(s) 185,186 are inserted in the respective holes 182, 183 and span the length of the retractable pin tool bar 184. Both glass-ceramic or fused quartz have very low coefficients of thermal expansion with glass-ceramic approaching zero. The thermal expansion of an all fused quartz rod is approximated in column 197 of FIG. 15 and shown as curve 198 in FIG. 17. Thermal and mechanical motions of the measuring rod(s) 185,186 (FIG. 18) are transmitted to, and continuously measured by, a low voltage differential transformer ("LVDT") 187 attached via a bracket 199 to the retractable pin tool bearing housing 188. This measurement becomes a dynamic offset to the displacement set point for the pin tool 181. This system of detecting changes in length of the pin tool 181 from thermal and mechanical eliminates the thermal and mechanical length uncertainty factor of the pin tool 181 or reduces it by about a factor of about 40.

Figure 19:
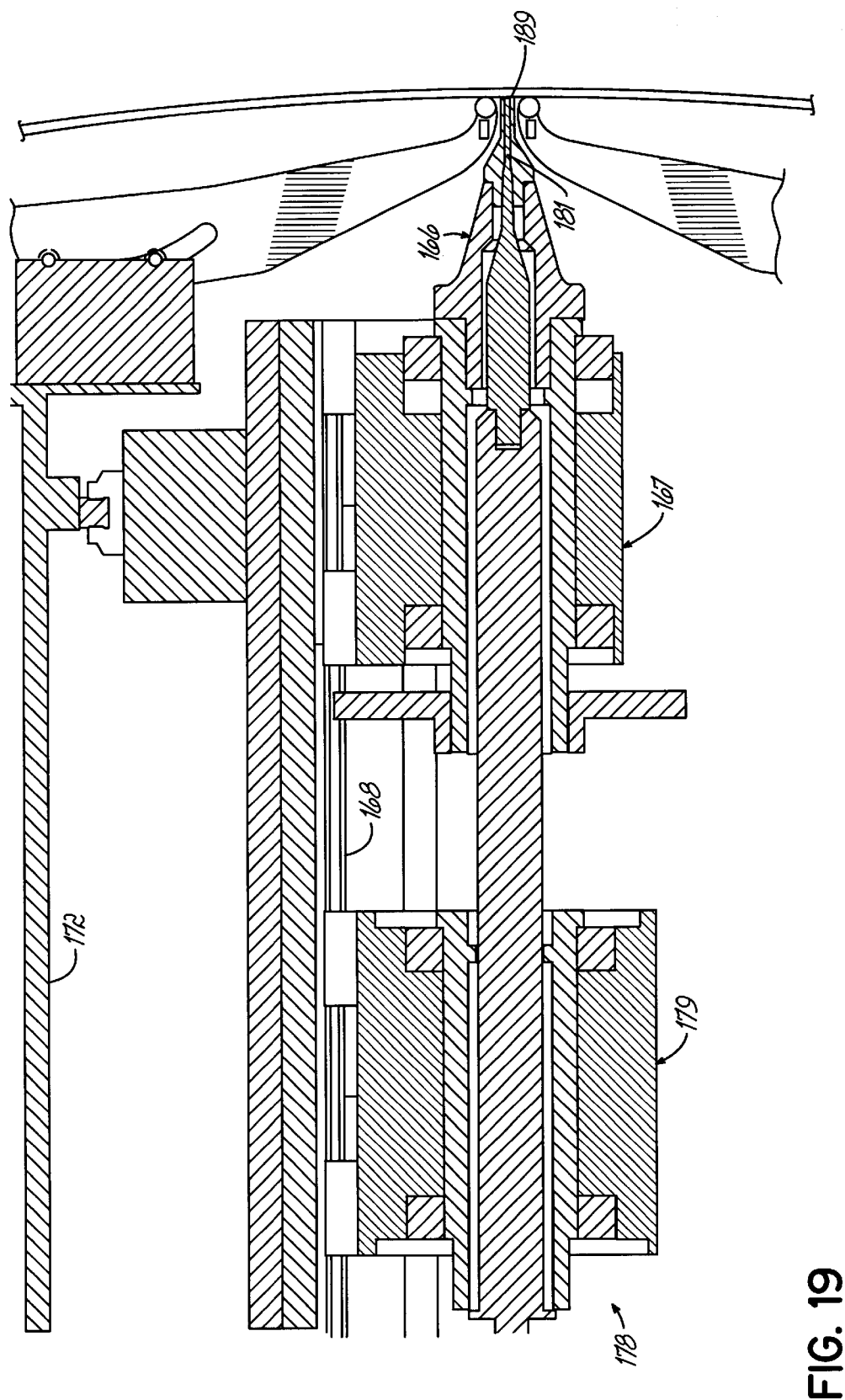
FIG. 19 is a centerline cross-sectional top view of a friction stir welding machine with a horizontal spindle having a retractable pin tool without a growth measurement system.

The implementation of the retractable pin tool concept has typically been constrained by existing equipment and has led to very clever systems, which fit into two different constrained friction stir welding spindle systems. A new approach simplifies the execution of this critical system, and in addition opens the architecture to facilitate technology improvements. Referring to FIG. 19, the approach is to have two independent, coaxial spindle systems, a spindle block 167 and a retractable pin tool block 179, that plunge on common anti-friction ways 168. The spindle block 167 has a large internal diameter, and carries the shoulder element 189 of the stir welding tool 166 in a 50 taper adapter with integral heat barrier. (It also will carry any cutting tool for shaving or panel parting). The pin tool 181 is mounted inside the shoulder tool 189. The second spindle system or retractable pin tool block 179 carries an easily removable, substantial pin tool bar 184 that mounts the retractable pin 181 in a simple, manual chuck and thermal isolator of very similar design to the shoulder tool chuck/isolator. Each of these spindle systems 167, 179 is independently positioned by a robust, accessible, servomotor/gearbox/rollerscrew/ loadcell mechanism (not shown). These positioning/force control elements are stationary with respect to spindle rotation, and present no challenge for electrical or signal connectivity. All of these motions are equipped with both servo feedback and independent force and displacement transducers.

One of the significant issues in controlling the RPT extension is the thermal expansion of the pin tool 181 and mechanism during the weld start transient. This behavior is easily seen in the NASA technical papers on load control of retractable pin tools. The pin tool slowly grows longer after it is plunged into the weld metal. The length of time that it takes this phenomenon to reach steady state is longer because of the increased length/diameter value of the retractable pin tool and the thermal sinks represented by the larger shank and chuck components. There are capabilities specified for the friction stir welding tool to mitigate this, but there is value in eliminating the transient uncertainty of pin tool length. This can be achieved by electrically preheating the pin tool 181, and probably the shoulder tool 189, to the 800° F. weld temperature, and by supplying positive ventilation through the main spindle toward the tool end. Preheating the tool eliminates the thermal transient caused by the weld heating the tool, and the ventilation keeps heat from convecting over the thermal barriers to warm other parts of the mechanism. Another useful feature is the driving of the retractable pin tool system 180 at a very slow relative rotation with respect to the shoulder. This helps to minimize any tendency for the pin tool 181 to stick relative to the shoulder tool 189.

Roller screws are used for imposing the forces and motions of plunging the two spindle block 167 and retractable pin block 179 and the cross-weld travel. Roller screws are robust, high force and low backlash, and are unique in that they can be made with very small leads. The advantage to the small lead is that the screw can be mated to an appropriate servomotor directly, eliminating the need for a gear reducer. The result is a lower maintenance, more compact package.

The weld travel axis is a good candidate for acme screws. The use of an acme screw can arguably eliminate a fail-safe brake on the weld axis servomotor, or can eliminate the brake function as a single-point failure concern if the mechanical efficiency of the weld axis screw is low enough that the weight of the head cannot backdrive the gearbox. The use of dual acme screws eliminates a single point failure issue for supporting the stir weld head. One screw is the primary force carrying element (equipped with the weld travel axis load cell), and the other screw is an unloaded follower screw capable of supporting the head if the primary system is compromised.

Process Monitoring Position Feedback

The linear position measurements use magnetostrictive absolute position sensors (Balluff or Temposonics). These devices provide absolute position, sidestepping the issue of homing the axes. On the vertical weld axis, two separate transducers are made to appear as one by signal conditioning electronics. These devices are robust, economical, and will meet the accuracy specifications.

Work Clamping and Part Handling, Access to the Weld for Inspection

The issue of full access to the weld for fit-up inspection prior to welding has led to some rather large clamping elements, but these components are simple, robust and intrinsically force balanced as shown in FIG. 20. Referring to the left clamp system 164, a cylinder rod 173 of a retracting air cylinder 174 is connected to and actuates one end of a clamp lever 190 by an operator using a pendant or workstation control. The clamp lever 190 is pivoted using a curved slot 191 moving over rollers 192. This feature allows the placement of a virtual pivot 193 at a point below the surface of the left panel 162. An opposite end of the clamp lever 190 contacts and clamps an edge of the left panel 162 to the anvil column 160.

The air cylinder 174 does not react its forces to the clamp beam or column 172. Rather, the air cylinder 174 is connected to and pulls on one end of a reaction lever 175 that is connected at its opposite end to the clamp column 172 and an offloading force-balance column 176. This reaction lever 175 has the same mechanical advantage as the clamp beam/lever 190. Thus, the clamp column 172 is subjected to equal and opposite forces and moments from the two lever fulcrums at 192, 194; and the clamp load or force is applied to the reaction force-balance column 176. The reaction force balance column 176 can deflect considerably without any effect on the clamp geometry. As other clamps are applied and the welding force offload mechanism travels the length of the weld, the deflection of the offloading force-balance column 176 changes. The air cylinder 174 applies an essentially constant force. Further, there are no side loads on the cylinder rod 173, and the cylinder 174 has minimal seal friction. Therefore, the clamp force remains constant regardless of deflection of the offloading force-balance column 176. This system is essential to minimizing/eliminating deflection of the clamp column 172.

The clamp column 172 and anvil column 160 are spaced to allow a normal size person to address the weld joint with both hands. To cover the vertical extent of the joint, an inspector can ride on a suitably equipped spindle platform as a vertically adjustable work carriage. Guards preventing pinch points and two hand no-tie-down controls need to be provided, as well as elevator safety provisions like an escape ladder.

Seam Tracker

A capable, vision based seam tracking system (not shown) is also used.

In the described embodiment, the vacuum systems 123 on the table 26 are controlled by respective valves 132, and there is a separate vacuum system for each part to be used on the table. As will be appreciated, other vacuum systems may be used. For example, the upper plate 106 of the table 26 may contain a plurality of bores located in a grid or matrix, and a mechanical valve is mounted in each hole. Such a mechanical valve is normally-closed and has a stem projecting above an upper surface of the upper plate 106 such that the stem is depressed by a part being placed on the table over the valve. The part depressing the stem operates the valve to apply a partial vacuum pressure through the valve and into the volume between the top of the table and the lower surface of the part. Thus, a vacuum is applied at every point where the part lies over a table mounted valve. Further the joint between the peripheral edge of the part and the table can be sealed with a tape to prevent the vacuum from leaking. In addition, to further seal the vacuum, the joint between the parts can be covered with a tape or other material that does not interfere with the welding process. The tape can be consumed by the welding process, or alternatively, as the tool advances, the tape can be pushed back on itself by an edge of the tool holder or the pressure of a "bow wave" advancing under the tool. In another embodiment, the tape can be peeled off of the joint and rolled up by an attachment mounted on the spindle or another part of the machine. In a further alternative, another sealing material, for example, metal shim stock, may be used to seal the joint and then pulled away or rolled up as the rotating tool advances along the joint.

Therefore, the invention in its broadest aspects is not limited to the specific detail shown and described. Consequently, departures may be made from the details described herein without departing from the spirit and scope of the claims which follow.

What is claimed is:

1. A friction stir welding machine for friction stir welding a joint between two parts comprising:

a first member adapted to support a rearward side of the joint between the two parts;

a second member fixed with respect to the first member and adapted to be located forward of the joint between the two parts;

a spindle head mounted on the second member and movable along a length of the second member;

a rotatable friction stir welding tool mounted on the spindle head and movable in a first direction toward and away from the first member supporting the joint between the two parts; and a force balancing member fixed with respect to the first and second members, the force balancing member operable to provide a counterbalancing force in the first direction reacting a friction stir welding process force.

2. The friction stir welding machine of claim 1 wherein the counterbalancing force is substantially equal to the friction stir welding force, so that a sum of friction stir welding forces in the first direction on the second member is approximately zero.

3. The friction stir welding machine of claim 2 wherein the force balancing apparatus provides the counterbalancing force substantially colinearly with the friction stir welding force, so that force moments on the second member are substantially zero.

4. The friction stir welding machine of claim 1 further comprising a process force actuator supported by the force balancing member and operable to apply the friction stir welding process force in the first direction on the friction stir welding tool, thereby holding the friction stir welding tool in the joint.

5. The friction stir welding machine of claim 1 further comprising a tying member rigidly connecting the first, second and third members.

6. A friction stir welding machine for friction stir welding a joint between two parts comprising:
- a first member adapted to support a rearward side of the joint between the two parts;
- a second member rigidly connected to the first member for reacting a friction stir welding process force and adapted to be located forward of the joint between the two parts;
- a third member positioned between the first and the second members;
- a spindle head mounted on the third member and movable along a length of the third member; and
- a rotatable friction stir welding tool mounted on the spindle head and movable in a first direction toward and away from the first member supporting the joint between the two parts.

7. The friction stir welding machine of claim 6 wherein the third member is rigidly connected to the first and second members.

8. The friction stir welding machine of claim 7 wherein each of the first, second and third members has first and second opposed ends and the first ends of the first, second and third members are rigidly connected together to form a frame.

9. The friction stir welding machine of claim 8 further comprising a first linking member rigidly connecting the first ends of the first, second and third members together.

10. The friction stir welding machine of claim 8 wherein the second ends of the first, second and third members are rigidly connected together.

11. The friction stir welding machine of claim 10 further comprising a first linking member rigidly connecting the first ends of the first, second and third members together, and a second linking member rigidly connecting the second ends of the first, second and third members together.

12. The friction stir welding-machine of claim 7 further comprising a process force actuator supported on the second member and operable to apply a friction stir welding process force on the friction stir welding tool in the first direction toward the first member, thereby holding the friction stir welding tool in the joint.

13. The friction stir welding machine of claim 12 wherein the second member provides a counterbalancing force reacting the friction stir welding process force.

14. The friction stir welding machine of claim 13 wherein a sum of the friction stir welding process force and the counterbalancing force acting on the third member in the first direction is substantially zero.

15. The friction stir welding machine of claim 7 further comprising:
- a first actuator mounted on the spindle head and operable to move the friction stir welding tool in the first direction; and
- a second actuator mounted on the third member and operable to move the spindle head along the length of the third member.

16. The friction stir welding machine of claim 7 further comprising a clamping system supported by the third member and adapted to apply a clamping force against one of the parts and the first member.

17. The friction stir welding machine of claim 16 wherein the clamping system comprises fulcrums on opposite sides of the third member.

18. The friction stir welding machine of claim 7 wherein the clamping system applies equal and opposite forces on the third member.

19. The friction stir welding machine of claim 16 wherein the second member provides a clamping counterbalancing force to react the clamping force.

20. The friction stir welding machine of claim 19 wherein a sum of clamping force and the clamping counterbalancing force acting on the third member is substantially zero.

* * * * *

UNITED STATES PATENT AND TRADEMARK OFFICE
CERTIFICATE OF CORRECTION

PATENT NO. : 6,554,175 B1
DATED : April 29, 2003
INVENTOR(S) : Thompson

It is certified that error appears in the above-identified patent and that said Letters Patent is hereby corrected as shown below:

Column 2,
Line 17, "stirwelding" and should read -- stir welding --.

Column 3,
Line 4, "forforcing" and should read -- for forcing --.
Lines 23 and 64, "stirwelding" and should read -- stir welding --.

Column 10,
Lines 5-6, "stirwelding" and should read -- stir welding --.

Column 14,
Line 2, "stirwelding" and should read -- stir welding --.

Column 15,
Line 3, "17,600 1bs." and should read -- 17,600 lbs. --.

Column 20,
Line 1, "welding-machine" and should read -- welding machine --.
Line 29, "claim 7 wherein" and should read -- claim 17 wherein --.

Signed and Sealed this

Sixth Day of January, 2004

JAMES E. ROGAN
*Director of the United States Patent and Trademark Office*